United States Patent [19]
Kehl et al.

[11] Patent Number: 5,710,910
[45] Date of Patent: Jan. 20, 1998

[54] ASYNCHRONOUS SELF-TUNING CLOCK DOMAINS AND METHOD FOR TRANSFERRING DATA AMONG DOMAINS

[75] Inventors: Theodore H. Kehl; Steven M. Burns, both of Seattle, Wash.

[73] Assignee: University of Washington, Seattle, Wash.

[21] Appl. No.: 316,604

[22] Filed: Sep. 30, 1994

[51] Int. Cl.$^6$ ............................................. G06F 1/04
[52] U.S. Cl. .................. 395/551; 395/555; 395/558
[58] Field of Search .................. 395/550, 551, 395/552, 553, 555, 556, 558, 559, 560; 364/270.2, 271.6; 371/61, 62, 67.1

[56] References Cited

U.S. PATENT DOCUMENTS

| | | | |
|---|---|---|---|
| 3,609,698 | 9/1971 | McCormick | 340/172.5 |
| 3,783,256 | 1/1974 | Caputo et al. | 235/153 AK |
| 4,712,190 | 12/1987 | Guglielmi et al. | 364/900 |
| 5,140,680 | 8/1992 | Best | 395/325 |
| 5,189,670 | 2/1993 | Inglis | 370/94.1 |
| 5,237,696 | 8/1993 | Best | 395/725 |
| 5,434,996 | 7/1995 | Bell | 395/550 |
| 5,455,931 | 10/1995 | Camporese et al. | 395/550 |
| 5,473,274 | 12/1995 | Reilly et al. | 327/159 |

OTHER PUBLICATIONS

Kehl, Ted; "Hardware Self–tuning Circuit Performance Monitoring" IEEE Computer Society; Oct. 1993.
Seitz, Charles; Chapter 7 "System Timing," Introduction to VLSI Design; Addison–Wesley, 1980.
Chapiro, Daniel; "Globally–Asynchronous Locally–Synchronous Systems"; Dept. of Comp. Sci. Thesis, Stanford University 1984.
Rosenberger et al., "Q–Modules: Internally Clocked Delay–Insensitive Modules," IEEE Trans. on Computers, vol. 37 No. 9; 1988.
Martin, Alain; "The Design of a Self–Timed Circuit for Distributed Mutual Exclusion," 1985 Chapel Hill Conference on VLSI.
Hurdle et al.; "Reliable Interfacing of Self–Timed FPGA–based Neural Classifiers to Synchronous Parts", More FPGAa, W.R. Moore & Luk (eds.); Abingdon EE&CS Books 1994.
Seitz, Charles, "Introduction To VLSI Design", Addison–Wesley, 1980, Chapter 7, System Timing, pp. 218–262.
Chapiro, Daniel, "Globally–Asynchronous Locally–Synchronous Systems", Stanford University, 1984, pp. 1–123.

*Primary Examiner*—Dennis M. Butler
*Attorney, Agent, or Firm*—Steven P. Koda

[57] ABSTRACT

One or more domains are independently clocked with separate clocks. Each clock is an asynchronous stop/start clock implementing a self-tuning clocking methodology. Domain circuit speed is monitored and the clock adjusted to tune the domain to run at near maximum speed. Inter-domain data transfers are performed by a four-way handshaking method. In effect the clock period of the respective clocks during the data transfer becomes the slower period of the two domains' clock periods. An inter-domain arbiter is implemented at each domain for deciding which domain's request is to be granted during an immediate clock period. Data input to a domain is tracked to determine when data is present. When no data is present, the domain's clock is stopped.

43 Claims, 13 Drawing Sheets

ASYNCHRONOUS SELF-TUNING CLOCK DOMAINS AND METHOD FOR TRANSFERRING DATA AMONG DOMAINS

FEDERAL FUNDING STATEMENT

This invention was made with government support under grant number MIPS 9101464 awarded by the National Science Foundation. The government has certain rights in the invention.

CROSS REFERENCE TO RELATED APPLICATIONS

This invention is related to U.S. patent application Ser. No. 07/938,287 filed Aug. 31, 1992 for Self-Timed Computer System and Methods, now abandoned. The content of that application is incorporated herein by reference and made a part hereof.

BACKGROUND OF THE INVENTION

The present invention relates generally to clocking methodologies for digital circuits, and more particularly to a self-tuning clocking methodology. The invention also relates to a self-tuning clock domain and a system of asynchronous self-tuning clock domains. Further, the invention relates to a method and apparatus for transferring data between asynchronous self-tuning clock domains. Still further, the invention relates to a method and apparatus for determining when a domain has data to process and for stopping a domain's clock when it has no data to process.

CLOCKING METHODOLOGIES

The self-tuning clocking methodology of this invention is preceded by a synchronous clocking methodology and a self-timing clocking methodology. Conventional digital circuits, and substantially all prior commercial computer architectures employ the synchronous clocking methodology. According to the synchronous methodology, a single clock reference is generated by a crystal oscillator circuit, then distributed throughout a circuit, board or system. The distributed clock signal is used to adjust a local clock signal at a circuit or board so that clocking throughout a system is synchronized. As characterized by Ivan Sutherland in "A Theory of Logical Effort" (Sutherland, Sproul and Associates, Inc., Sep. 12, 1986), synchronous systems have "faith" that a signal will move error-free from one section of logic to another. To develop the "faith" digital designers make a worst-case timing analysis during design to estimate circuit delays. Delays typically vary for changes in temperature and voltage. The designer provides a clocking period to accommodate these worst case delays. For example, a 74F04 hex inverter specification gives a maximum delay of 6.5 ns for a worst case condition, but gives a maximum delay of 4 ns for typical conditions and a typical delay under normal conditions of approximately 1 ns. Virtually all designers use the worst case maximum delay to determine a system clocking period. By designing to worst case conditions, there is "faith" that the data will be available when the clock period ends. In a sense, however, this is overkill because for 99.999% of the time the data is available substantially before the end of the clocking period. Thus, there is a significant inefficiency to the conventional synchronous clocking methodology. Accordingly, there is a need for a more efficient, yet effective, clocking methodology.

An approach for a more efficient clocking methodology is the self-timing methodology. According to the self-timing methodology, data flow involves the steps of request (REQ), completion detect (CD) and acknowledge (ACK). In effect, the clock is eliminated. Round trip signalling (REQ-CD-ACK) is used, instead. First, a sending unit is ready and requests to send data to a destination unit. Second, logic detects completion of the data transfer. Third, an acknowledgement signal is returned to the sending unit. Thus, data movement is not accepted on "faith" as complete, but is "measured" as complete. Sutherland differentiates the "faith" in the synchronous methodology with the "measurement" in the self-timed methodology. A shortcoming of the self-timing methodology, however, is that the three steps involved are performed in series. Such serial execution can slow the system. In particular the completion detection step can cause delay. Another weakness of self-timing is that the completion detection logic can be more complex than the digital units exchanging data. Compared with the synchronous methodology, it is believed that self-timing leads to faster clocking speeds in some systems, but slower clocking speeds in others. Accordingly, there is need for a more versatile, efficient, and effective clocking methodology.

The self-tuning methodology takes features of synchronous and self-timed systems to achieve another clocking methodology. Like in the synchronous methodology, data transfers are clocked. But unlike the synchronous methodology, the clock period is tuned to run faster and faster until just before system failures. Like the self-timed methodology, data transfers are measured. But unlike the self-timed methodology, the measurements are done in parallel with the data transaction and the result of the measurement is not an acknowledge signal. Further, the beginning of the next period is not triggered by the acknowledge signal. The measurement result instead is used in the future for adjusting ("tuning") the clock period.

One advantage of the self-tuning clocking methodology is the tremendous increase in a system's operating speed. By allowing circuits to run at near maximum speed, system speeds are greatly increased.

SELF-TUNED CIRCUIT

U.S. patent application Ser. No. 07/938,287 for Self-Timed Computer System and Method referenced above and incorporated herein by reference has overlapping inventorship with this application. Such prior application discloses a modified self-timed system, including a self-tuned memory. A data transmission method is disclosed, in which a conventional self-timed REQ-CD-ACK signal process is altered. Like in other self-timed methods a clock is not used. The serial dependence of the three signals, however, is severed. First, a source register transfer module (RTM) generates an REQ signal notifying a destination RTM that data is coming. Instead of the destination RTM detecting completion (CD) and sending an ACK signal upon detection, an early ACK signal is sent after a programmable time period. Circuitry or software is included for tuning such programmable time period. In alternate embodiments, the early ACK signal is generated by the source RTM itself, the destination RTM or a related circuit. Completion detection occurs independently. A measurement circuit associated with the destination tests for completion of the transfer by sampling the destination contents and comparing it to the input data at various times within a time window. To operate at near maximum speed, there is a desired sampling pattern. At the first sample, it is desired that the destination contents correspond with last cycle's value (i.e., before the data level transition). Then, for all later samples it is desirable that the contents conflict with the prior sample (i.e., after the data level transition). For measurement patterns other than the desired pattern, the allotted data transfer time period is too slow or too fast. The measurement circuitry or software, therefore, causes a tuning signal to be generated to vary the programmable early ACK time period. Such tuning typically is not performed in time for the next transfer, but instead, for some future transfer.

The self-tuning concepts of the data transmission method are here applied more broadly as a clocking methodology for a system of self-tuning domains.

SUMMARY OF THE INVENTION

According to the invention, a digital circuit, sub-system or system includes one or more portions (i.e., domains) that are independently clocked with separate, adjustable clocks. Each clock is an asynchronous stop/start clock used in implementing a self-tuning clocking methodology. Each domain includes a plurality of digital circuit building blocks (i.e., register transfer modules—RTMs) which combine to perform a particular function or functions (e.g., memory, adder, co-processor, processor, computer). According to the self-tuning methodology, a maximum clocking rate of a domain is measured. The clock, then, is adjusted to run at this rate, or more preferably, at nearly this rate.

The maximum clocking rate can only be as fast as the slowest circuit in the domain, including any latency for clock distribution within the domain. At design time, the domain is analyzed to identify its slowest RTM. The performance of such RTM then is measured during operation to determine a maximum clocking period. As performance varies, the clock is adjusted (i.e., tuned), so that the domain always runs at nearly maximum speed. According to alternate embodiments, the time between detection of a change in circuit speed and adjustment of the clock may vary.

Because each domain is independently clocked, the respective domains operate asynchronously. Thus, there is need for a reliable method of transferring data between domains. According to the invention, the clock cycles of two domains are generally synchronized during an inter-domain data transfer.

According to one aspect of the invention, the adjustable clock is formed by a mutual exclusion element, an inverting gate and an adjustable delay line. The three circuits form a self-inverting loop which defines a clock period. The delay line receives a programmable input for adjusting the clock period. The mutual exclusion element serves as an arbiter between the self-inverting loop clock pulse and a data request line. When the clock pulse wins the arbitration, the clock cycle transitioning continues. When the data request line wins the arbitration, the clock stops. Should the mutual exclusion element become metastable, the clock pulse pauses for the metastable period. (Metastability is confined internally to the mutual exclusion element).

As described above, a domain's clock period is tuned by measuring domain circuit speed and adjusting the clock speed to run at near maximum circuit speed. According to another aspect of the invention, the clock also self-tunes for variations in domain circuit speed. Common causes of changes in circuit speed are voltage perturbations and temperature changes. Domain circuits exposed to a voltage perturbation or temperature change respond with changes in circuit response times (i.e., circuit speed; switching delay). An adjustable clock formed on the same wafer as its domain circuits, however, experiences the same voltage and temperature changes. Thus, the gates forming the adjustable clock cause the clock to slow down or speed up in response to the voltage or temperature change. This change in clock speed substantially parallels changes in domain circuit speed. Thus, the clock is inherently self-tuning when formed on the same substrate as its domain. Further, such self-tuning occurs at substantially the same time as the domain circuit speeds are varying. Additional tuning is performed by the measurement circuitry which adjusts the clock period to maintain a period for nearly maximizing circuit speed. The self-tuning quality of the adjustable clock provides an advantage over crystal oscillators which react differently to voltage and temperature changes, (i.e., crystal oscillators do not change their speed).

According to another aspect of the invention, inter-domain data transfers are performed by a four-way hand-shaking method. A source domain generates a request to send data to a destination domain. Such request is used to stop the clock of both the source and destination domain while the data is set up on a data path. Once the destination clock recognizes the request signal, a grant signal is returned to the source domain's clock and the data is read by the destination domain. The grant signal triggers restarting of the source, then destination domain clocks. The source domain drops its request signal, allowing the source and destination domain clocks to restart.

In effect, the clock period during the data transfer becomes approximately the longer clock period of the two domain clock periods. If the source domain clock period is faster, then the grant signal will not come back until near the end of the destination domain's clock period. Thus, the source domain's clock period is stretched, in effect, to approach the destination domain's clock period. If the source domain clock period is slower, then the grant signal comes back, but the request signal is not dropped until the end of a source domain clock period. Thus, the destination domain clock period is stretched, in effect, to approach the source domain's clock period. In other cases (e.g., two short clock periods), both clock's periods may be stretched to complete the hand-shaking.

According to another aspect of the invention, an inter-domain arbiter is implemented at each domain. The arbiter for a first domain arbitrates as to which one of the other domains requesting to send data is to be granted access to such domain during the immediate clock period. The arbiter is formed by a tree of mutual exclusion elements to reduce requests from multiple domains down to one arbitration winner.

According to another aspect of the invention, a domain is a pipeline for processing data. During one clock period, the domain receives up to one external data input and outputs up to one data output. Such output is distributed to one or more domains. In some embodiments, the domain is a simple linear pipeline. In other embodiments, the domain is more complex, including processing forks and joins that form domain branches.

According to another aspect of the invention, an external data input to a domain is tracked through the domain pipeline to determine when data to process is present. When the domain pipeline is empty, the domain's clock is stopped until data to process is received. For a simple linear pipeline embodiment, a shift register the length of the pipeline tracks the data through the pipeline by shifting a flag bit through the shift register in lockstep with the pipeline. For a more complex pipeline including branches, multiple shift registers are linked to track data through its domain path. The shift register paths parallel the domain branch paths.

One advantage of this invention is the significantly increased circuit speed achieved by the self-tuning clocking methodology. Circuit speed increases of 100% or more are achieved over comparable synchronously-clocked circuits.

Another advantage of this invention is that each domain is tuned to optimize its performance. Different domains therefore, may be clocked at different speeds.

Another advantage of this invention is that the adjustable clock is inherently self-tuning to respond to voltage perturbations and temperature changes.

Another advantage of this invention is that the tuning concepts can be applied to domains of varying complexity. A domain may include a few gates or an entire co-processor, subsystem or system.

Another advantage of this invention is that inter-domain data transfers are glitch-free, even though the source and destination domains are asynchronous with respect to each other. Specifically, the system is globally asynchronous, but includes locally synchronous domains.

Another advantage of this invention is that a domain's clock runs only when data is present. When no data is present, the domain circuits do not switch. Thus, power usage is significantly reduced.

Another advantage of this invention is that clock distribution is more manageable relative to synchronous circuits of comparable complexity. For highly complex circuits and fast system speeds (e.g., 100 MHz), designers struggle to distribute the clock throughout the system. For a self-tuning system, there are multiple clock domains. Each domain has its own clock which is proximally located. Thus, the clock signals typically have less distance to travel. This makes distributing the clock more manageable.

These and other aspects and advantages of the invention are achieved by a system of one or more asynchronous, independently-clocked, self-tuning domains. Each domain embodies a pipeline receiving up to one external data input per clock period and generating up to one external data output per clock period. Associated with each domain is an asynchronous stop/start clock and an inter-domain transfer arbiter. Domain speed is measured in software, measured by a dedicated circuit, or measured by a combination of software and circuitry. Results of the speed measurements are used to tune the domain's clock. The arbiter arbitrates among external data input requests to determine which request is granted for a given clock period. Four-way handshaking is performed between domain arbiters to stretch the faster domain's or both domains' clock periods during inter-domain data transfer. The invention will be better understood by reference to the following detailed description taken in conjunction with the accompanying drawings.

DESCRIPTION OF SPECIFIC EMBODIMENTS

Overview

Figure 1:
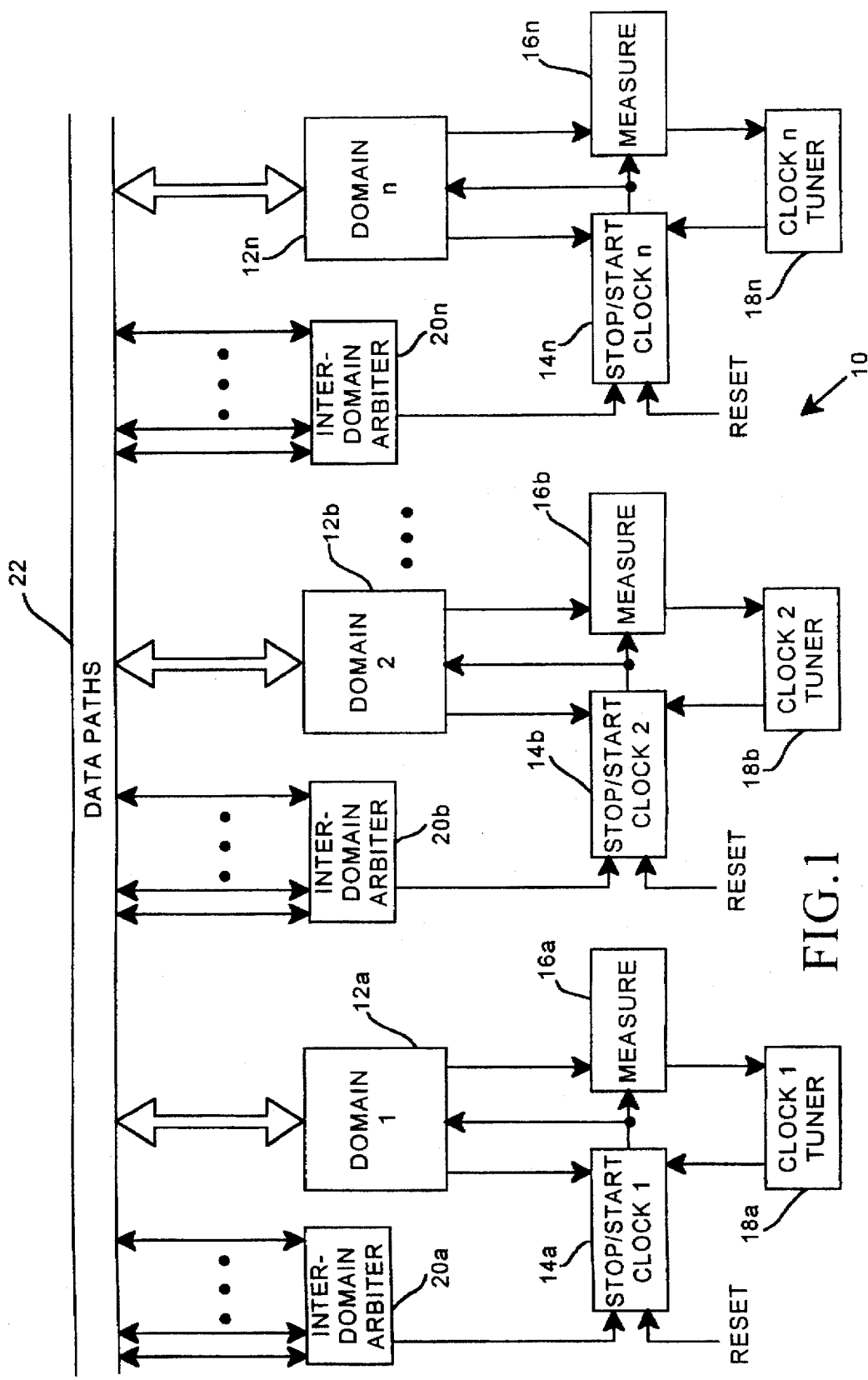
FIG. 1 is a block diagram of a system of asynchronous, self-tuning clock domains according to an embodiment of this invention, FIGS. 2 a–c are respective measurement signal diagrams taken within a domain for cases of a clock period which is too slow, too fast and tuned.

FIG. 1 shows a block diagram of a system 10 of asynchronous, self-tuning clock domains 12 according to one embodiment of the invention. The system 10 includes circuit domains 12, clocks 14, measure apparatii 16, tuners 18 and arbiters 20. Data paths 22 couple signals between domains. The system 10 can take on many embodiments, such as a custom logic array, an arithmetic unit, co-processor, processor, or computer. According to the invention, any digital circuit function can be embodied in one or more domains. The complexity of the system 10 and of each domain 12$i$ varies according to a given design application. As few as one domain, or up to an unlimited number of domains may be included. A domain may be as simple as a few gates or as complex as a processor or computer system.

Associated with each domain 12$i$ is an adjustable clock 14$i$, measure apparatus 16$i$, and clock tuner 18$i$. The clocks 14$a$–14$n$ are asynchronous stop/start clocks. Each clock 14$i$ defines an adjustable clock period for its respective domain 12$i$. A clock period is tuned at start-up and during operation to drive the domain circuits at near-maximum speed. As each domain 12$i$ is independently tuned and clocked, the domains 12$a$–12$n$ run asynchronously to each other. Within a domain 12$i$, however, the component circuits run synchronously at an adjustable, stoppable clock period. Although local intra-domain data transfers are synchronous, the clock cycle is stopped and started asynchronously to clock inter-domain data transfers.

To tune the clock period of a domain 12$i$, measurements are taken at a specified domain element during a sampling time window. Timing of a data transition during the window is used by tuner 18$i$ to adjust or "tune" the clock period of clock 14$i$.

Also associated with each domain 12i is an inter-domain arbiter 20i. The arbiter 20i receives request signals from 0 or more other domains 12 requesting to transfer data into domain 12i. The arbiter 20i sends a grant signal to a domain 12j which wins the arbitration. A data item (e.g., bit, word) then is transferred from domain 12j to domain 12i during the immediate clock period. The grant lasts only one clock period. Arbitration continues during later clock periods to determine which, if any, domains are to be given access for a given clock period.

Data paths 22 are shown for coupling request signals, grant signals and data signals of the various domains 12 and arbiters 20. In one embodiment the data paths are dedicated or switchable data paths. In another embodiment, the data paths 22 include a bus, or a diversity of bus, dedicated and/or switchable data paths.

Domain Tuning Strategy

The basic tuning strategy is to measure domain 12i circuit speed so that its clock 14i may be tuned to achieve optimal domain performance. Optimal domain performance is determined to be near-maximum circuit speed. A domain's maximum circuit speed is a function of the clock distribution delay and circuit response time at the domain's slowest (or deepest) pipeline link. If the clock speed is too fast for the slowest link, then the domain may output incorrect data. If the slowest path performs in timely fashion, however, then the remainder of the domain circuitry also will perform in a timely fashion. Accordingly, by optimizing clock speed for the slowest link, clock speed is optimized for the entire domain.

Conventional timing analysis and design paradigms enable designers to identify with high certainty the slower links in a circuit. Thus, the slowest (or deepest) link is identified at design time. The measure apparatus 16 is laid out to monitor transitions at such link. Embodiments of the measure apparatus 16 are described below in a separate section.

Because a domain 12i may embody a complex logic structure, a data input rippling through the domain may branch onto various paths before a domain output is generated. For a speed measurement to be useful, it is necessary for a measurement to occur along an exercised branch. Thus, for complex domain circuitry it is preferable to monitor circuit speeds along multiple branches of the domain circuit path. According to the invention, domain circuit speed is measured at one or more, up to all links in the domain.

When there are multiple measurements, however, the several results need to be interpreted to determine how or whether to adjust the clock. According to one approach, any measurement signifying the clock speed is too fast results in tuning the clock speed to a slower speed. This approach is justified because when the clock period is too fast for one link in the domain, that link may not complete its operation. Thus, there is a possibility of error. Determining when the clock should be speeded up is more complicated. According to one approach, the clock is tuned to speed up only when there are no "too fast" measurements. According to another approach, the clock is speeded up only in response to a test vector to be assured that the slowest link in the domain registered a valid measurement. Various strategies may be implemented to determine when to speed up in the absence of any "too fast" measurement results.

Three types of tuning operations are described here (start-up diagnostic tuning, intermittent diagnostic tuning, and continuous run-time tuning). At system start-up, diagnostic tuning is performed by running a test vector through the domain to tune the clock to near-maximum domain circuit speed. Intermittently thereafter, diagnostic tuning is repeated as a proactive correction strategy. Intermittent diagnostics are scheduled every few minutes or longer depending on design choice or operator selection. Intermittent diagnostic tuning also involves routing a test vector through the domain so that the slowest link in the domain is exercised and measured. Start-up and intermittent diagnostic measurements need only be taken at one link because a test vector is used. Such vector is selected to effectively exercise the slowest link.

Continuous run-time measurements are performed in some embodiments to provide immediate reactive corrections to tune the clock speed. Such reactive corrections are fed back to the clock to adjust the clock period in future clock cycles. Delays of 1 up to hundreds or thousands of clock cycles occur between measurement of the change in circuit speed and adjustment of the clock speed depending on the measure apparatus 16i and tuner 18i embodiment.

It is expected that changes in circuit speed occur gradually relative to clocking speed. Thus, in some embodiments, continuous run-time measurements are not performed. Preferred embodiments include, at least, start-up and intermittent diagnostic tuning. Other embodiments include start-up and intermittent diagnostic tuning, plus continuous run-time tuning.

Figure 2A:
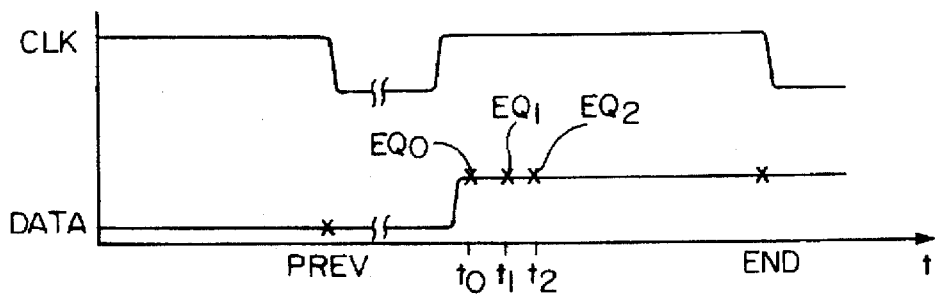
Figure 2B:
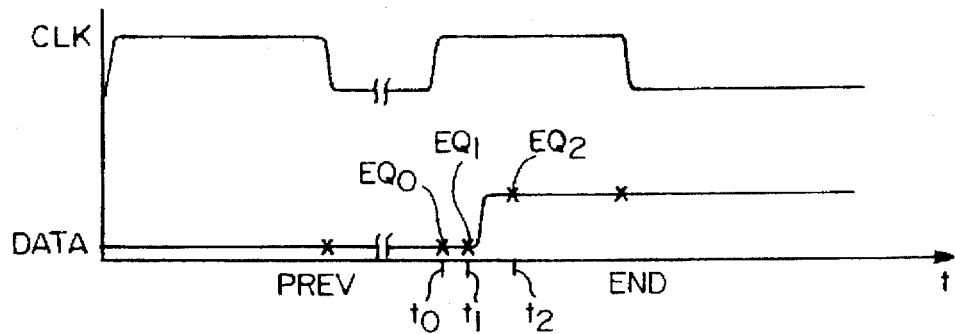
Figure 2C:
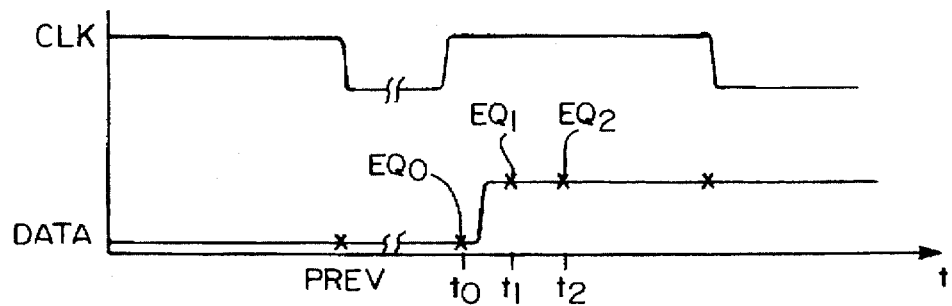

For tuning procedures in which measurements are taken at a domain link (i.e., register transfer module—"RTM"), a signal is captured at the end of each clock cycle for use in determining whether a signal transition has occurred relative to the previous cycle. If a transition has occurred then measurements taken at various times during a clock period are sampled. Each measurement sample is compared to the long term sample from the same clock cycle to determine whether there has been a transition at the domain link at a given time. Table 1 below and FIGS. 2a–c show various cases of measurement samples at a single domain link.

TABLE 1

| | Domain Link Measurements | | | |
|---|---|---|---|---|
| Case | $EQ_0$ | $EQ_1$ | $EQ_2$ | Indication |
| a | 1 | 1 | 1 | Too slow |
| b | 0 | 0 | 1 | Too fast |
| c | 0 | 0 | 1 | Tuned |

At the start of a clock period, an output signal from a domain link under measure is input to measure apparatus 16i. During the clock period, such output signal is sampled three times in succession at times $t_0$, $t_1$, and $t_2$. All three samples are compared to the final output signal resulting in measurement samples $EQ_0$, $EQ_1$, and $EQ_2$ which are latched at the end of the clock period. The third sample, from which $EQ_2$ is derived, is assumed to be correct. A value of "0" in the table signifies that the sample at time $t_i$ differs from the long term sample. A value of "1" in the table signifies that the sample at time $t_i$ is the same as the long term sample.

Referring to FIG. 2a, the results for a case (a) indicating a "too slow" clock period are shown. Preferably, a domain is designed to start at an initial speed, then be speeded up as it is tuned to an optimal performance speed. Thus, this case is expected to be the first case to occur during start-up diagnostics. Time PREV indicates last cycle's long term signal sample. Time END indicates this cycles long term signal sample. If the value at time END differs from the value at time PREV, then measurements $EQ_0$, $EQ_1$, and $EQ_2$ are taken. Otherwise, measurements are not taken this cycle. The value at time END then becomes the time PREV value for the next cycle. The "too slow" clock period case shows that the transition at the domain link output occurred near the beginning of the clock period. At the first sample time, $t_0$, $EQ_0$ equals 1 meaning that the value is the same as the long term value. Thus, the transition has already occurred. Times $t_1$ and $t_2$ confirm the transition. In this case, it is desirable to shorten the clock period to speed up the clock allowing the transition to be sampled later in the clock period.

Referring to FIG. 2b, the results for a case (b) indicating a "too fast" clock period are shown. The "too fast" clock period case shows that the transition at the domain link output occurred near the end of the clock period. At times, $t_0$ and $t_1$, $EQ_0$ and $EQ_1$ equal 0 signifying the signal value differs from the long term value. Thus, the transition has not occurred yet. Finally, at time $t_2$, $EQ_2$ equals 1 indicating the signal is the same as the long term value. Thus, the signal transition has occurred. In this case, it is desirable to lengthen the clock period to slow down the clock allowing the transition to be sampled earlier in the clock period.

Referring to FIG. 2c, the results for a case (c) indicating a "tuned" clock period are shown. The "tuned" clock period case shows that the transition at the domain link output occurred near a desired portion of the clock period. At the first sample time, $t_0$, $EQ_0$ equals 0 signifying the signal value differs from the long term signal value. Thus, the transition has not occurred yet. At time $t_1$, $EQ_1$ equals 1 signifying that the signal value equals the long term value. Thus, the transition has occurred. The measurement $EQ_2$ at time $t_2$ confirms the transition.

Preferably, the transition is to occur between times $t_0$ and $t_1$ so the samples both register and confirm the transition. In the "too slow" case, the transition occurred before any samples are taken. In the "too fast" case, the transition is noted, but not confirmed. In the "tuned" case, the transition is noted, then confirmed. The preferred sampling times within the clock period and preferred sampling interval(s) between sample times $t_0$, $t_1$, and $t_2$ may vary so that the "tuned" case occurs at a desirable location within the clock period. According to one embodiment, the preferred location may be near the center of the clock period. According to other embodiments, the preferred location may be more toward the beginning or end as long as the transition is noted and confirmed. In embodiments in which measurements are taken at multiple RTMs, the preferred locations may vary from one RTM to the next.

The self-tuning clocking methodology tunes a circuit close to its maximum operating speed. According to the method described above, nulling type logic is implemented. As a circuit speeds up the clock rate increases accordingly. Similarly, when a circuit slows down, the clock rate slows down accordingly. An attractive feature of this nulling approach is that absolute circuit speed need not be defined. Also, absolute delay values are not required. The clock is simply adjusted until the desired set point pattern (e.g., 011) is attained.

One potential concern is whether measurements could signify to speed up and slow down during alternating measurements in oscillatory fashion. If slow sampling was not already in use, one might switch to a longer sampling interval. Also, a damping term could be added to the measurement analysis to eliminate oscillation. For example, the clock period would be determined to be "too short" or "too long" only after such indication occurred consecutively during a prescribed number of clock cycles.

Measure Apparatus and Tuner

Figure 3:
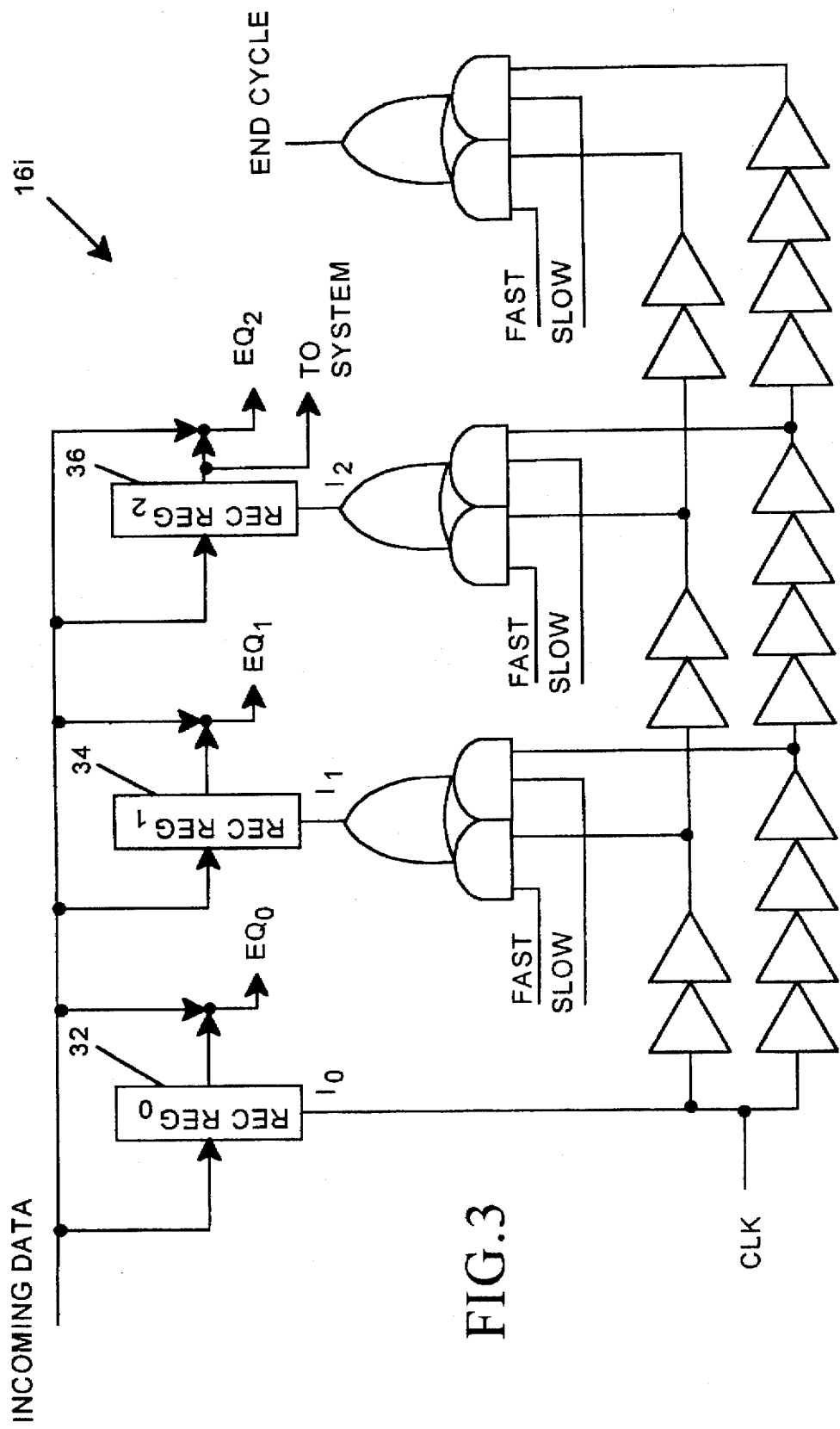
FIG. 3 is a logic circuit diagram of a measure apparatus of FIG. 1 according to an embodiment of this invention.

FIG. 3 shows a logic diagram of one embodiment of a measure apparatus 16i according to an embodiment of this invention. The measure apparatus 16i receives a data signal from the domain link under measure and a clock signal from the stop/start clock 14i. In response to the clock pulse three receiving registers 32, 34, 36 are strobed to sample the incoming data signal at times $t_0$, $t_1$, and $t_2$. An end of cycle signal causes latch devices (not shown) to lock-in the $EQ_i$ signal values. At the end of the sampling cycle, each sample is compared with the long term incoming data signal to define respective signals $EQ_0$, $EQ_1$, and $EQ_2$. A "0" indicates that the sample and long term values are differ. A "1" indicates that the sample and long term value are the same.

The sampling timing and sampling interval(s) are defined by delay lines. According to the embodiment shown, sample time $t_i$ is delayed by two or four inverter delay times from time $t_{i-1}$. The sampling interval of two or four inverter delay times is selectable. In alternate embodiments, other delay lengths are implemented to increase or alter the sampling interval choices. In one embodiment the sampling interval between a first and second sample varies from a sampling interval between a second and third sample. In another embodiment, the number of samples taken varies, with at least three being preferred. Further, the structure for defining the sampling times and sampling intervals varies using other digital or analog sampling and timing circuits.

At the end of the sampling cycle, the signals $EQ_i$ are read by the clock tuner 18i. For a domain measuring only one domain link, the analysis of signals is straightforward. If the measurements signify that the clock 14i is tuned, then no changes occur. If the measurements signify that the clock period is too slow, then the clock is sped up a notch. If the measurements signify that the clock period is too fast, then the clock is slowed down a notch. For a domain measuring more than one domain link, the analysis differs as described above.

The period for making the clock adjustment varies according to the embodiment of the measure apparatus 16i and tuner 18i. If the apparatii 16i and tuner 18i are dedicated logic circuits, then the corrective action is nearly immediate. The clock period is adjusted for the next or subsequent period. In an alternative embodiment filtering logic is implemented by which the measure results are the same for a prescribed number of clock periods before the corrective action is taken.

In one embodiment, the tuner 18i is dedicated logic or a finite state machine that responds to a given EQ signal pattern to define an appropriate tuning signal. The tuning signal then indicates no change, speed up clock one notch, or slow down clock one notch. The amount to speed up or slow down for one notch may vary.

In another embodiment, the tuner 18i is embodied by software executed by a processor. Such processor may or may not be part of the system 10 according to various embodiments. The executed software analyzes the signals $EQ_i$ to determine what corrective action to take, if any, and when to take such action. The software embodiment will have some inherent delay between EQ signal sampling and clock adjustment. Filtering EQ samples or sample analysis over multiple clock periods also may be performed in software.

In another embodiment the measure apparatus 16 and tuner 18 are embodied in software. For example, a software embodiment for tuning an adder involves inputting test vectors to the adder to derive a known result. During various runs, the clock speed is increased until the result differs from the known result. The speed is then decreased so that the result equals the known result. By strategically choosing a test vector that exercises the adder circuits, the adder is tuned to operate at an optimum or near-maximum speed.

Asynchronous Stop/Start Clock

Figure 4:
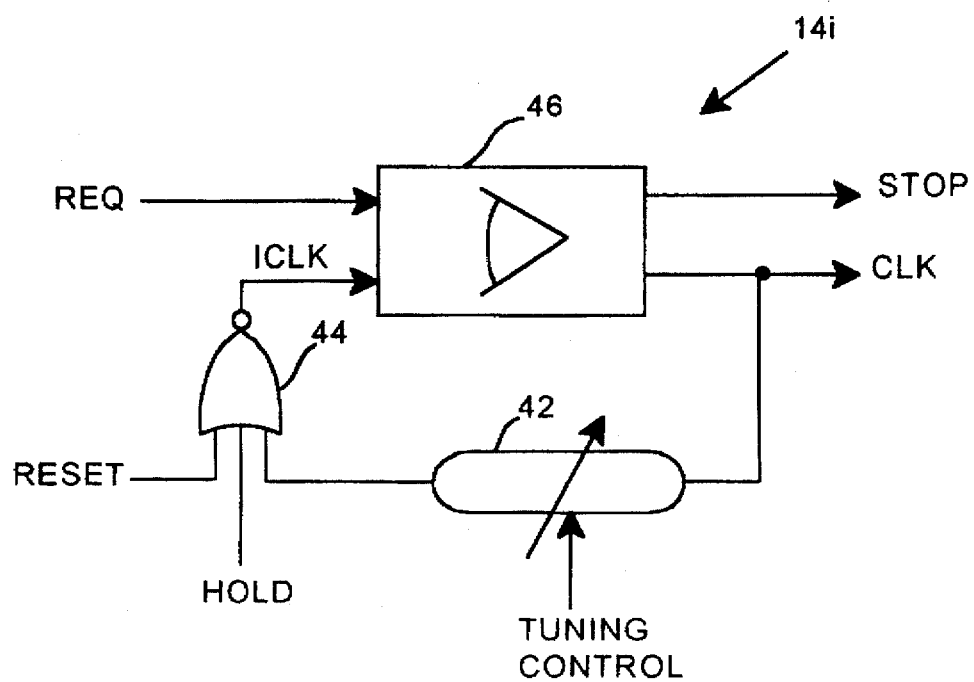
FIG. 4 is a logic circuit diagram of an asynchronous stop/start clock of FIG. 1 according to an embodiment of this invention.

FIG. 4 shows an asynchronous stop/start clock 14$i$ according to an embodiment of this invention. The clock 14$i$ serves to define a cyclical clock signal having an adjustable clock period. Further, the clock signal can be stopped and restarted asynchronously. The clock 14$i$ includes an adjustable delay line 42, a NOR gate 44 and a mutual exclusion element 46. During normal cyclical operation, the mutual exclusion element 46 delay line 42 and NOR gate 44 form a self-inverting loop. The output clock signal is tapped from the loop. The delays introduced by the delay line 42, nor gate 44 and mutual exclusion element 46 define the clock period of signal CLK. The clock period is adjusted by varying the delay at delay line 42. A tuning signal is received from tuner 18$i$ to step-up or step-down the delay.

The NOR gate 44 receives the clock signal returning through the delay line, a reset signal and a hold signal. During normal operation the reset and hold signals are inactive, so that the return clock signal inverts to form a cyclical clock signal output from the mutual exclusion element 46. To reset the clock 14$i$, the reset signal is set active at NOR gate 44. The reset pulse, in effect, defines a starting edge for the reset CLK signal.

The hold signal is input from the corresponding domain 12$i$ and becomes active when there is no data under process within the domain 12$i$. While the hold signal is active, the clock signal output from the mutual exclusion element 46 stays inactive without transition. Thus, the domain 12$i$ is clocked only when data is present for processing.

The mutual exclusion element 46 is an arbitration device which allows the clock 14$i$ to be stopped, then started asynchronously. The mutual exclusion element continuously arbitrates between signals REQ and ICLK. When signal ICLK wins the arbitration, the CLK output is active and the STOP output is inactive. When signal REQ wins the arbitration, the STOP output is active, and the CLK output is inactive. During normal cyclical clock operation, signal REQ is inactive. The self-inverting loop then generates an active ICLK input to the mutual exclusion element 46 periodically to define the cyclical clock signal CLK. When signal REQ becomes active, it wins the arbitration immediately or upon the completion of a clock pulse at ICLK. If signal ICLK is at an inactive portion of its signal period, then signal REQ wins the arbitration immediately. If signal ICLK is still at an active portion of its signal period, then it continues to win the arbitration. Once ICLK goes inactive, signal REQ wins the arbitration.

Whenever signal REQ wins the arbitration, the clock stops (i.e., signal CLK stays inactive). When signal REQ goes away (becoming inactive), then the NOR gate inverts the inactive CLK signal to generate an active ICLK signal which then wins the arbitration and restarts the clock.

Figure 5:
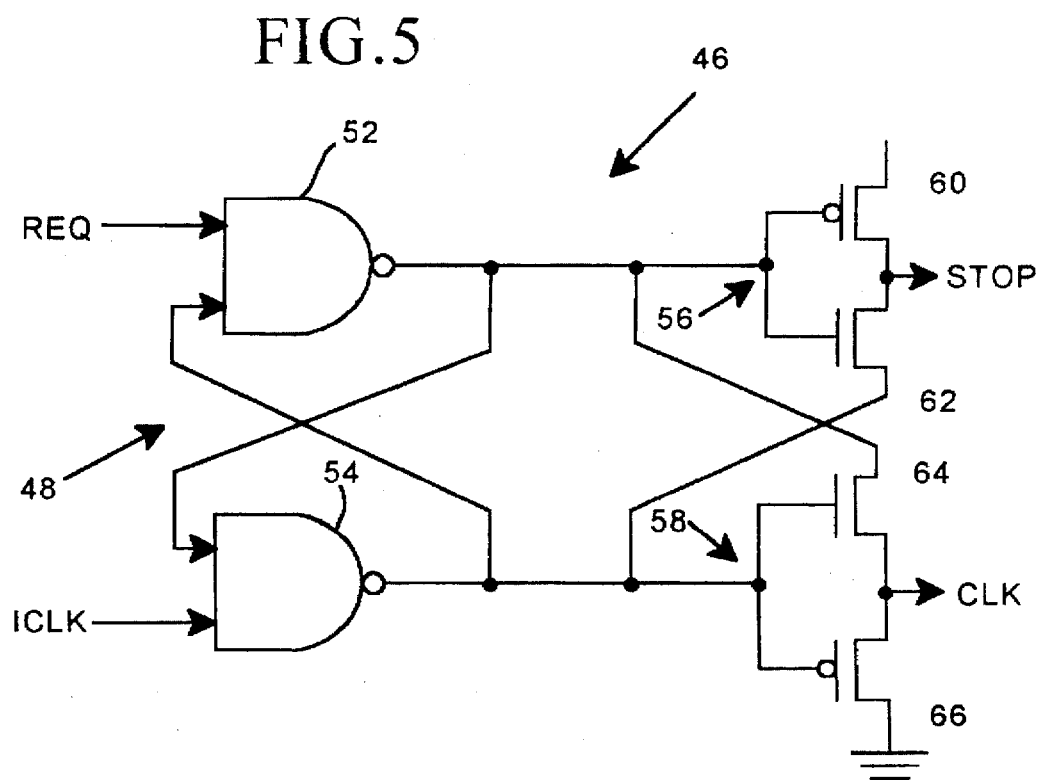
FIG. 5 is a schematic diagram of a mutual exclusion element of the clock of FIG. 4 according to an embodiment of this invention.

FIG. 5 shows a circuit diagram for a conventional mutual exclusion element 46. Other circuit embodiments also may perform the arbitration. The element 46 includes an RS flip-flop 48 formed by cross-coupled NAND gates 52, 54. At the output of each NAND gate is a stage, 56, 58. One stage 56 generates the STOP line output. The other stage 58 generates the CLK line output. The stages 56, 58 also are cross-coupled. Stage 56 is formed by FETs 60, 62. Stage 58 is formed by FETs 64, 66.

A mutual exclusion element exhibits metastability when both REQ and ICLK go true at the same time, such that neither wins the arbitration immediately. The duration of the metastable period is indeterminate. It is analogous to waiting to see which way a balanced pin will fall.

In synchronous systems, the indeterminate length of metastability may interfere with the system timing. However, in a self-tuning system, the metastable period is simply an elongation of a single clock period. It causes a delay, but does not interfere with system timing and does not corrupt data. Any metastability is internal to the mutual exclusion element and not experienced in the surrounding circuitry.

Domain Circuitry

Figure 6:
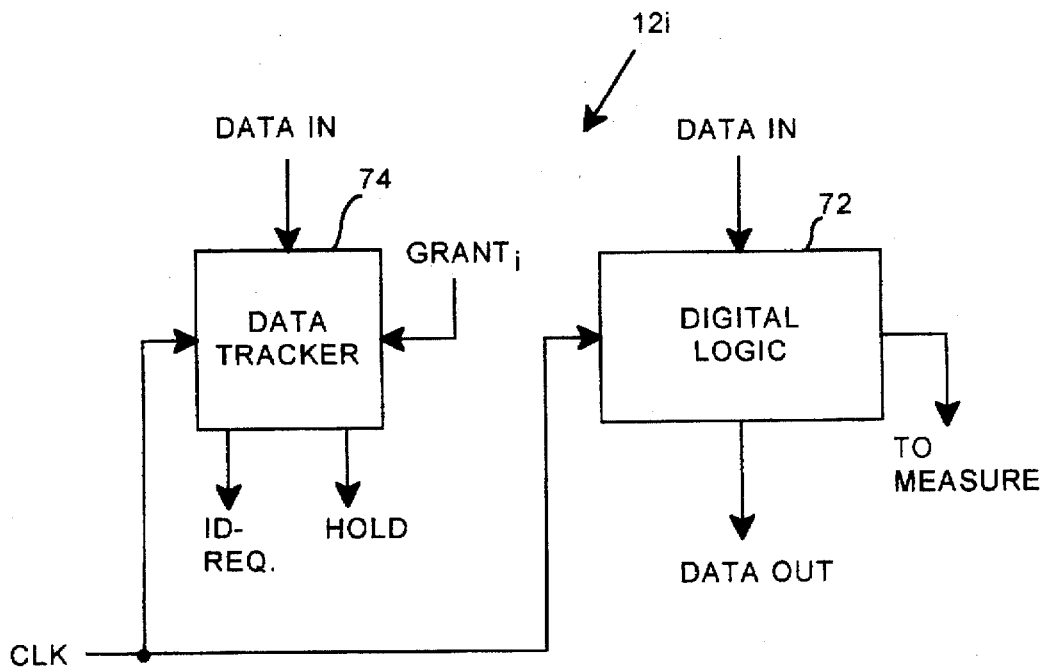
FIG. 6 is a block diagram of a domain according to an embodiment of this invention.

FIG. 6 shows a block diagram of a domain 12$i$. The domain 12$i$ includes digital logic 72 and a data tracker 74. The digital logic 72 receives an external data input (DATA IN), then generates an external data output (DATA OUT). Measurements are taken from a component of digital logic 72 to perform the tuning function described above.

Data tracker 74 determines when there is data rippling through the digital logic 72 and when there is an external data output REQuest. When data is allowed into the domain 12$i$, a grant signal is activated to signal the source domain 12$j$. Such grant signal also is input to the data tracker to signify that data is in domain 12$i$. When the data input is processed completely a signal ID_REQ is generated to signal that there is a data output request. Such signal is routed to a destination domain arbiter 20$k$ and to the domain 12$i$'s arbiter 20$i$. When the domain 12$i$ has no data rippling through it, then the data tracker 74 generates a signal HOLD which stops domain 12$i$'s clock 14$i$. The digital logic 72 and data tracker 74 receive a clock signal CLK from the adjustable clock 14$i$. The clock signal moves the external data input through the digital logic 72 and advances the data tracker 74.

Simple Domain Structure

Figure 7:
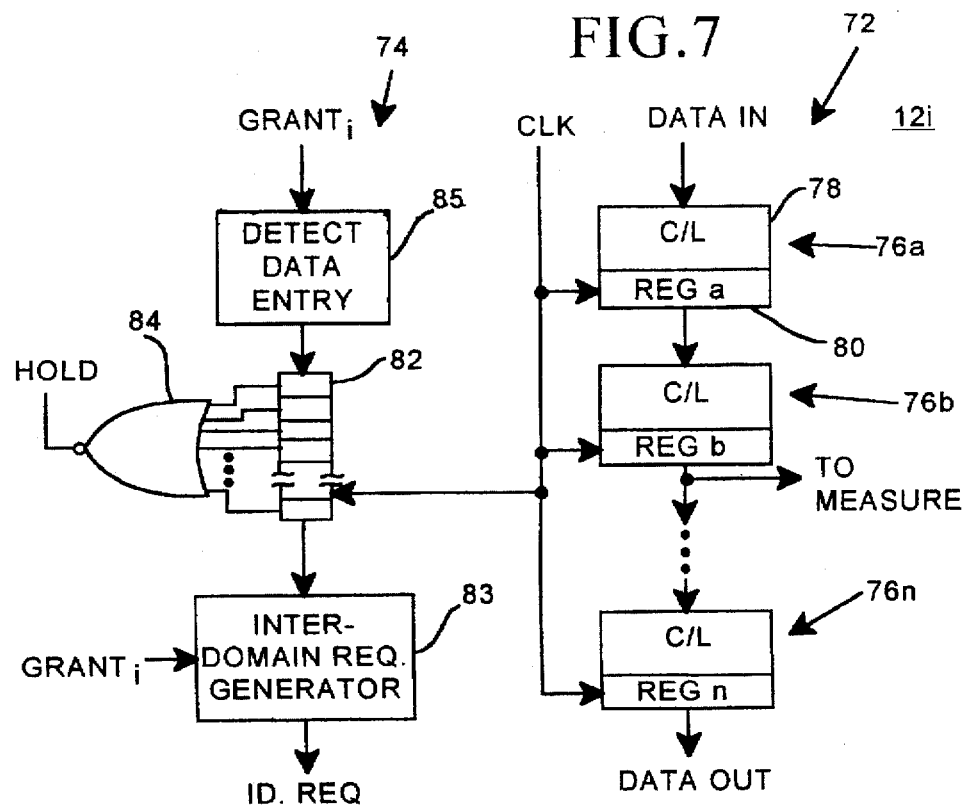
FIG. 7 is a logic diagram of a domain according to an embodiment of this invention.

FIG. 7 shows an embodiment of digital logic 72 and data tracker 74 for a simple linear pipeline domain. The digital logic is represented by fundamental register transfer module "RTM" building blocks 76. Each RTM 76$i$ is formed by combinational logic 78$i$ and for a register 80$i$. The number of RTMs 76 varies according to the domain 12$i$ embodiment. Data ripples through the RTMs 76 in pipeline fashion, advancing one RTM per clock cycle until a resulting data output signal is generated at the last RTM 76$n$. Each RTM 76$i$ is a link in the domain's data path. For a simple linear pipeline domain, there are no branches along the data path.

Tracker 74 includes a shift register 82. When data enters the domain 12$i$ (as determines by an active GRANT signal), the first bit in the shift register is set. As the data advances through the digital logic 72, one RTM 76 link per clock cycle, the tracking bit advances in lockstep through the shift register 82. When the data completes the digital logic pipeline a data output signal is generated. During the same clock cycle, the tracking bit is output to an REQ signal generator 83. The generator activates an inter-domain data request line ID_REQ. Address bits (not shown) determine where the data output signal (DATA OUT) is to go and where the inter-domain data request is to go.

The digital logic 72 is analogous to a pipeline. Up to one external data input (DATA IN) is allowed into the domain 12$i$ during a given clock cycle. The shift register 82 tracks each data input through the digital logic 72 pipeline. When the pipeline is empty, a NOR gate 84 monitoring shift register 82 contents generates a signal HOLD to stop the domain 12$i$'s clock 14$i$. When a grant is made to allow a data input to domain 12$i$, its clock is subsequently restarted.

In an alternative embodiment, the data output signal is routed to one or more other domains 12. For an output for multiple domains, the generator 83 maintains the ID_REQ signal until any or all domains grant the data transfer request according to the embodiment. The grant signal GRANTi returning to a source domain 12$i$ from a destination domain 12$j$ clears the ID_REQ signal.

Complex Domain Structure

Figure 8:
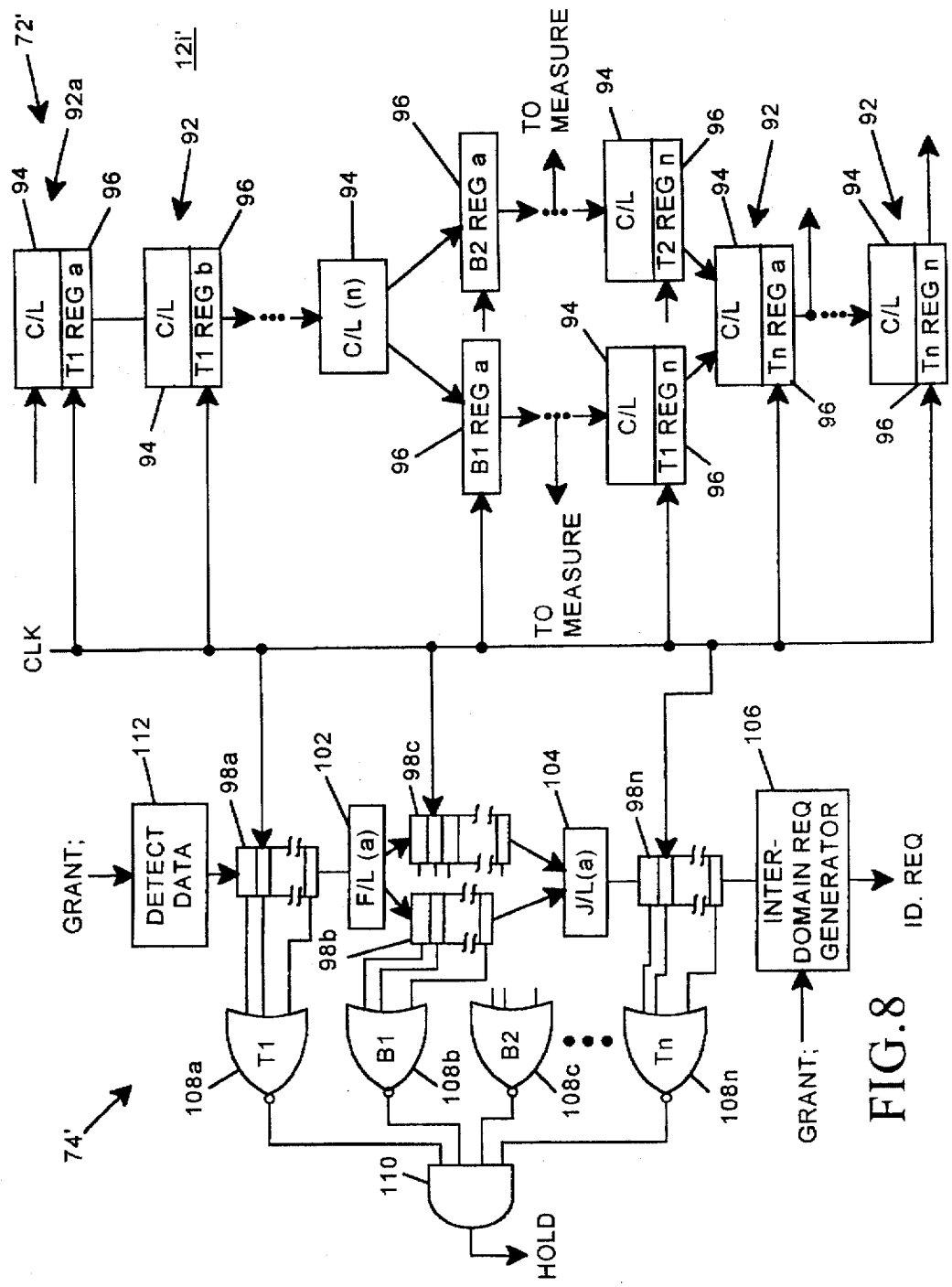
FIG. 8 is a logic diagram of a domain according to another embodiment of this invention.

FIG. 8 shows alternative embodiments of digital logic 72' and data tracker 74' for a more complex domain 12i'. The digital logic 72' is formed by a complex pipeline of register transfer modules 92. Each register transfer module 92 includes combinational logic 94 and/or a register 96. The RTMs 92 form pipeline trunks and branches. Data enters the digital logic at a first trunk. The registers for the trunk are labeled trunk '1' register 'a' (TL REG a), trunk '1' register 'b' (T1 REG b) and so on. At the end of the trunk T1 combination logic 94 forks to couple to two or more branches, B1, B2, . . . , Bn. Data under process then is passed to one or more of these branches.

For example, FIG. 8 depicts two branches B1, B2 stemming from the trunk T1 fork at combinational logic C/L(n). Either or both branches become active to continue processing data. The data under process then ripples through each active branch B1, B2 until the respective branch ends. A branch ends at a "join" RTM.

At a join RTM the data is passed from one or more branches into combinational logic 94. The combinational logic acts upon one or both branch outputs to form a data value at the join RTM register 96. As the branches B1, B2 may be of varying length, the combinational logic may be designed to take data from the first branch to finish, to wait for both to finish, or to wait for some or all branches to pass data to the join RTM's combinational logic. Alternatively, each branch is made the same length by filling in RTMs on the shorter branch.

FIG. 8 shows two branches joining at a trunk Tn. The data is received from one or more branches then ripples through the trunk Tn. In the embodiment shown trunk Tn is at the end of the digital logic pipeline. Thus, the data ripples through from RTM to RTM leading to a domain output signal DATA OUT at the nth RTM (Tn Reg n).

The digital logic 72' varies in complexity according to the embodiment. Multiple branches off a trunk or another branch occur. Joins from multiple branches occur leading to another branch or a trunk. According to one topology, a complex digital logic circuit 72' receives no more than one data input signal DATA IN during a given clock period and generates no more than one data output signal DATA OUT during a given clock period. Thus, all forks are resolved by joins according to one topology so that the data output occurs at the end of the final trunk. The data output signal may be routed to multiple addresses.

According to another topology, a complex digital logic circuit 72' receives no more than one data input signal DATA IN during a given clock period but can generate 0 or more data output signals DATA OUT during a given clock period. An output signal may occur along multiple branches and/or trunks in such topology.

The data tracker 74' executes similarly to the data tracker 74 described above. For more complex digital logic 72', however, the data tracker may include multiple shift registers to track data. According to one embodiment there is a shift register 98 for each trunk or branch in digital logic 72'. When an external data input is received into digital logic 72', a bit is set at the input of the first trunk's shift register 98a. The bit then is shift in lockstep with the data as the data ripples through trunk T1. When a fork occurs, fork logic F/L 102 tracks whether the data is routed to one or more branches. The tracking bit then is shifted into the entry bit of a shift register for each active branch. The tracking bit is shifted in lockstep with the data through the digital logic 72' active branches.

For each join in digital logic 72', there is join logic J/L 104 which accepts the tracking bit from a branch's shift register.

The join logic correlates to the join occurring at digital circuit 72' to identify whether to move the tracking bit immediately or to wait until one or more tracking bits from other branches reach the join. In a system of equal length branches join logic 104 is not used, because the tracking bits arrive at the same time. Further, in an embodiment in which every data input requires the same number of clock cycles to be processed and result in an output, a single shift register 82 without forking or joining logic, as per the data tracker 74, is used (See FIG. 7).

In FIG. 8 a tracking bit is received from either or both of shift registers 98b and 98c. These registers correspond to branches B1 and B2. According to the embodiment, the first tracking bit is passed, held or merged with another tracking bit. Eventually one or more tracking bits are shifted in sequence into another shift register (98n) at the join branch or trunk. In FIG. 8, the join occurs at a trunk Tn.

The tracking bit then shifts through the trunk Tn's corresponding shift register 98n in lockstep with the data through trunk Tn. When a data output signal DATA OUT is generated at digital logic 72', the shift register 98n shifts the tracking bit into the inter-domain REQ generator 106. The generator 106 outputs signal ID_REQ to request an inter-domain data transfer to one or more domains. A grant signal GRANTi returning to a source domain 12i from a destination domain 12j clears the IS_REQ signal.

The shift registers 98 track each data input through the digital logic 72' pipelines. For each shift register 98 (and thus for each branch or trunk), a NOR gate 108 performs a "NOT OR" function on its bits. When no data is present in the branch or trunk, the corresponding NOR gate 108 activates a signal. An AND gate 110 combines the signals so that the tracker 74' actives a signal HOLD at the clock 14i only when every trunk and branch is empty (i.e., no data in domain 12i').

Inter-Domain Arbiter

Figure 9:
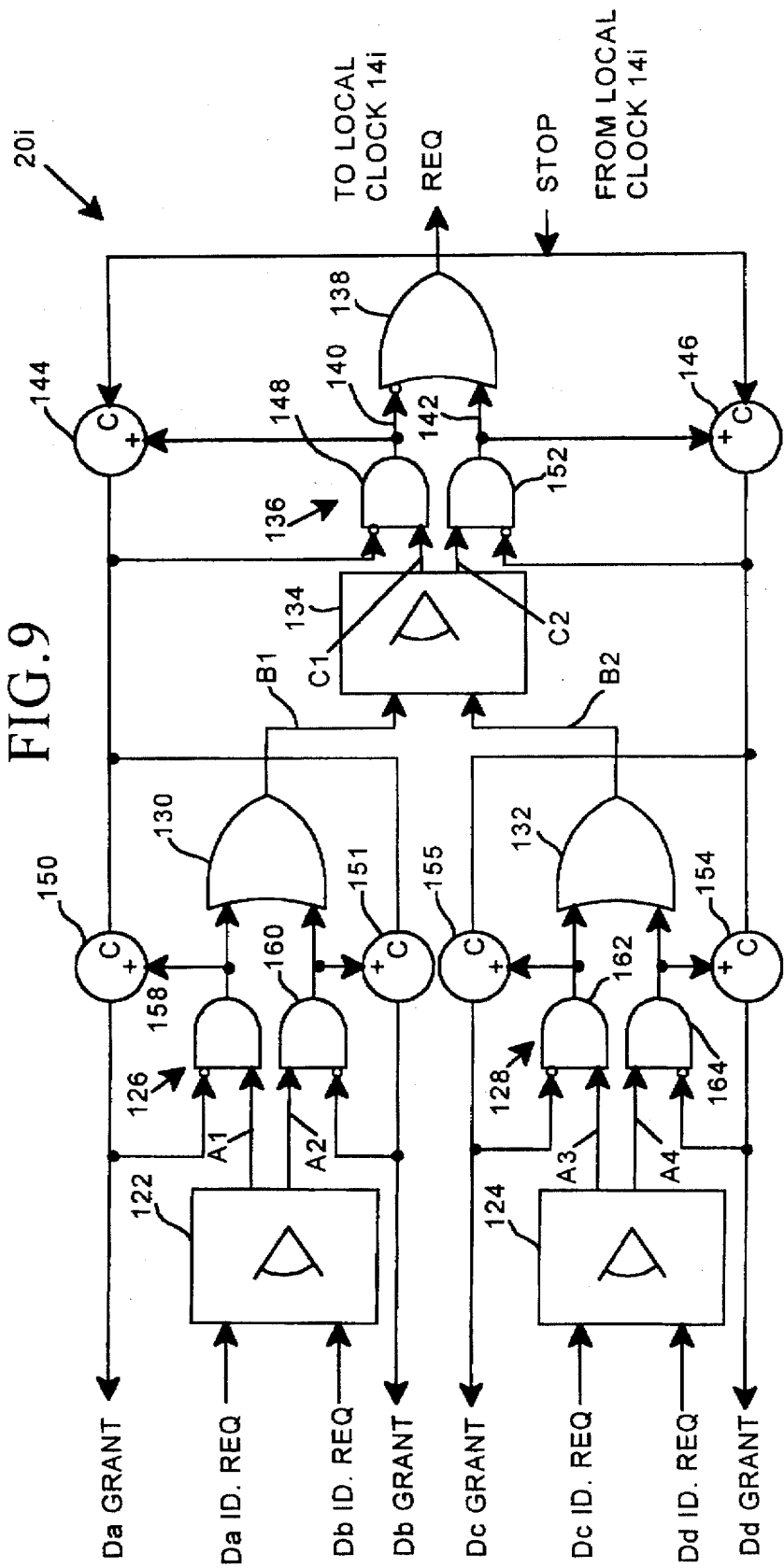
FIG. 9 is a logic diagram of an inter-domain arbiter of FIG. 1 according to an embodiment of this invention.

FIG. 9 shows an inter-domain arbiter 20i for a domain receiving data from any of three other domains. For an arbiter 20d, inter-domain request signals (ID_REQ) are received from each domain 12a–12c and the local domain 12d. The arbiter 20d determines which domain request is forwarded to stop the local clock 14d. Only one of the three other domains is allowed to transfer data into domain 12d during the ensuing clock cycle. Alternatively, the local domain may request to stop the clock 14d to send data outside the local domain 12d. The arbitration result generates a request signal REQ to the local domain 12d's clock 14d. When the inter-domain request from one of the three other domains 12a–c wins the arbitration, the clock 14d's STOP signal serves as a grant signal to acknowledge a data transfer handshake between the local domain and winning domain.

For the four domain arbiter 20i, four request signal inputs are handled. To arbitrate among the four requests two stages of mutual exclusion elements are included. The first stage of mutual exclusion elements 122, 124 perform a first stage arbitration to reduce the number of signals. Element 122 receives a domain 'a' request signal 'Da ID_REQ' and a domain 'b' request signal 'Db ID_REQ'. Element 124 receives a domain 'c' request signal 'Dc ID_REQ' and the local domain request signal Dd ID_REQ. Each element 122, 124 generates two outputs, only one of which may be active at a given time (the winner of that element's arbitration). The outputs A1, A2 of element 122 are confirmed at an interim logic stage 126 to avoid having the lower level request signal (B1) clear too soon. Similarly, the outputs A3, A4 of element 122 are confirmed at an interim logic stage 128 to avoid having the lower level request signal (B2) clear too soon. The logic stage 126 outputs are OR'ed at gate 130. The logic stage 128 outputs are OR'ed at gate 132. Each gate 130, 132 generates an output B1, B2, respectively. Signals B1, B2 are input to a second stage arbitration. In the embodiment shown the second stage only has two signals to arbitrate. Thus, one mutual exclusion element 134 performs the arbitration. Element 134 generates two output signals C1, C2, only one of which is active at a given time. The outputs C1, C2 of element 134 are confirmed at an interim logic stage 136 to avoid having the intermediate level request signals 140, 142 clear too soon. The logic stage 136 outputs are OR'ed at gate 138 to generate a request signal REQ at the local clock 14d. For the embodiment shown, REQ will go active when any one or more of the inputs 'Da ID_REQ', 'Db ID_REQ', 'Dc ID—REQ' or Dd ID_REQ goes active.

The active REQ signal is input to the local domain's 14i clock. The REQ signal and returning clock signal ICLK (see FIG. 4) are arbitrated at the clock's mutual exclusion element. When the REQ signal wins, the clock 14i stops causing STOPi to become active. This STOP signal is fed back into the arbiter 20i to activate a grant signal responsive to the ID_REQ signal that won the arbiter 20i arbitration. Thus, if the domain 'a' inter-domain request Da ID_REQ wins the arbitration, a GRANTa signal is returned to domain 'a'. Similarly, GRANTb or GRANTc becomes active if Db ID_REQ or Dc ID_REQ, respectively, wins the arbitration.

The STOPi signal enters the arbiter 20i at two Mueller C-elements 144, 146. A Mueller C-element has the following truth table:

| Input 1 | Input 2 | Output at time t + 1 |
| --- | --- | --- |
| 0 | 0 | 0 |
| 0 | 1 | Output at time t |
| 1 | 0 | Output at time t |
| 1 | 1 | 1 |

The output transitions to '0' if and only if both inputs are '0'. Similarly, the output transitions to '1' if and only if both inputs are '1'. Thus, the output maintains its previous value until both inputs assume the same value.

Mueller C-element 144 receives the STOPi signal and the output of AND gate 148. The output of Mueller C-element 144 is fed to an inverting input of AND gate 148 and to the first arbitration stage Mueller C-elements 150, 151. Similarly, Mueller C-element 146 receives the STOPi signal and the output of AND gate 152. The output of Mueller C-element 146 is fed to an inverting input of AND gate 152 and to the first arbitration stage Mueller C-elements 154, 155.

At the first arbitration stage, Mueller C-element 150 receives the output of Mueller C-element 144 and the output of AND gate 158. The output of Mueller C-element 150 is fed to an inverting input of AND gate 158 and to the first domain 12a as the GRANTa signal. Mueller C-element 151 receives the output of Mueller C-element 144 and the output of AND gate 160. The output of Mueller C-element 151 is fed to an inverting input of AND gate 160 and to the second domain 12b as the GRANTb signal. Mueller C-element 154 receives the output of Mueller C-element 146 and the output of AND gate 162. The output of Mueller C-element 154 is fed to an inverting input of AND gate 162 and to the third domain 12c as the GRANTc signal. Mueller C-element 155 receives the output of Mueller C-element 146 and the output of AND gate 164. The output of Mueller C-element 155 is fed to an inverting input of AND gate 164 and to the fourth domain 12d as the GRANTd signal. GRANTd is invalid when the local domain is domain 12d. GRANTa goes active when Da ID_REQ wins the arbitration. GRANTb goes active when Db ID_REQ wins the arbitration. GRANTc goes active when Dc ID_REQ wins the arbitration.

In some embodiments each domain can transfer data to any other domain. For a system 10 having only one domain, arbitration is not needed. For a system having 2–4 domains, two arbitration stages are implemented. For a system having 5–8 domains, three arbitration stages are implemented. For a system having 9–16 domains, four arbitration stages are provided. A similar relationship between the number of domains and arbiter stages occurs for larger systems. Thus, according to a tree-structure arbiter 20i, one or more arbitration stages are implemented for a multi-domain system 10.

In other embodiments, a given domain is not able to transfer data directly to every domain. Instead, the data must pass through an intermediate domain. For example, data from a memory-instruction domain may have to pass through a processor's instruction-cache domain before entering a processor's CPU domain. The intermediate domain may vary in function and complexity. Such intermediate domain may even serve a bus-like function or a data distribution function. When intermediate routing is used, the arbiter's complexity is reduced because fewer input signals are arbitrated.

Inter-Domain Data Transfer

Figure 10:
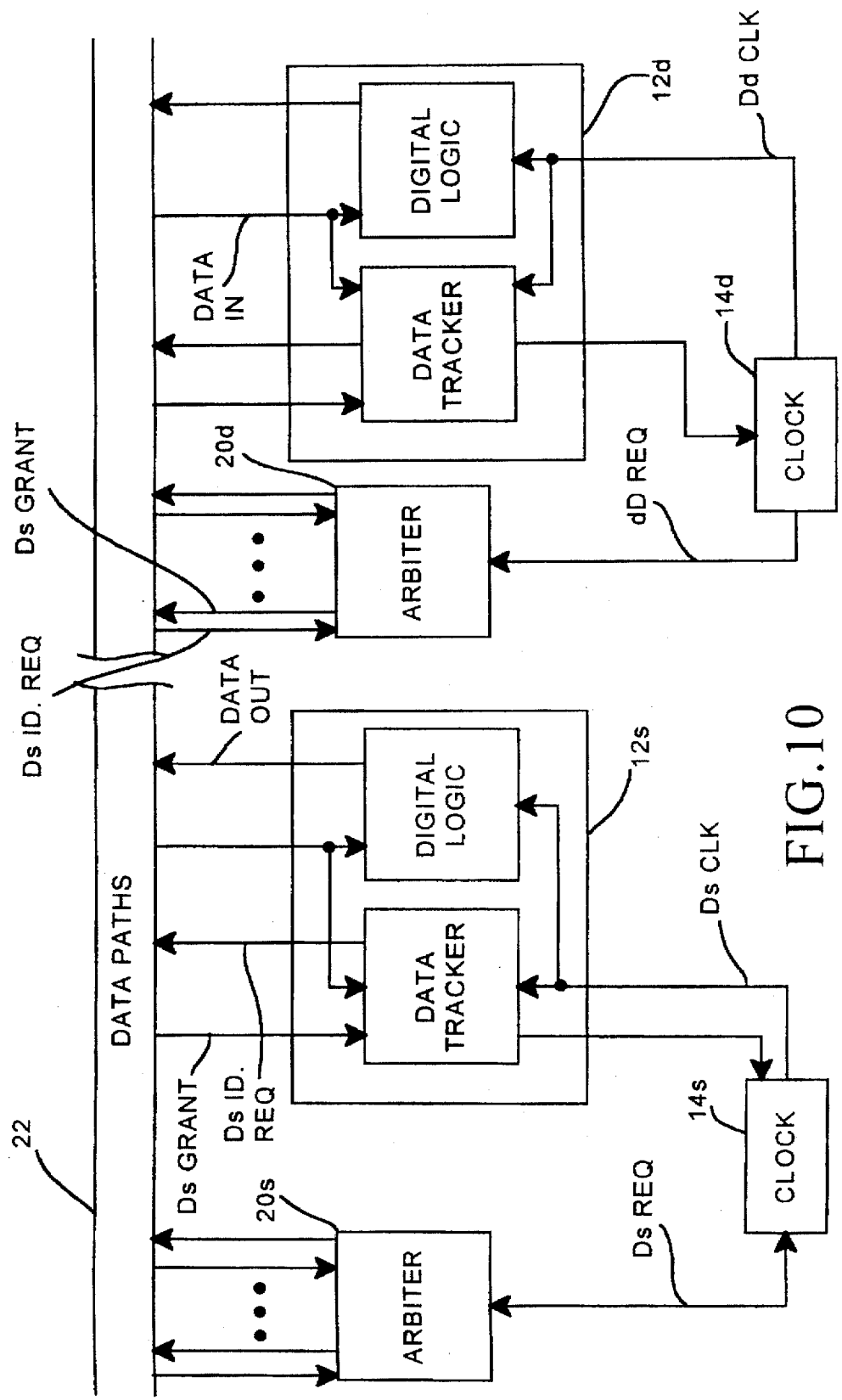
FIG. 10 is a diagram of a part of the system of FIG. 1 used for describing an inter-domain data transfer.
Figure 11:
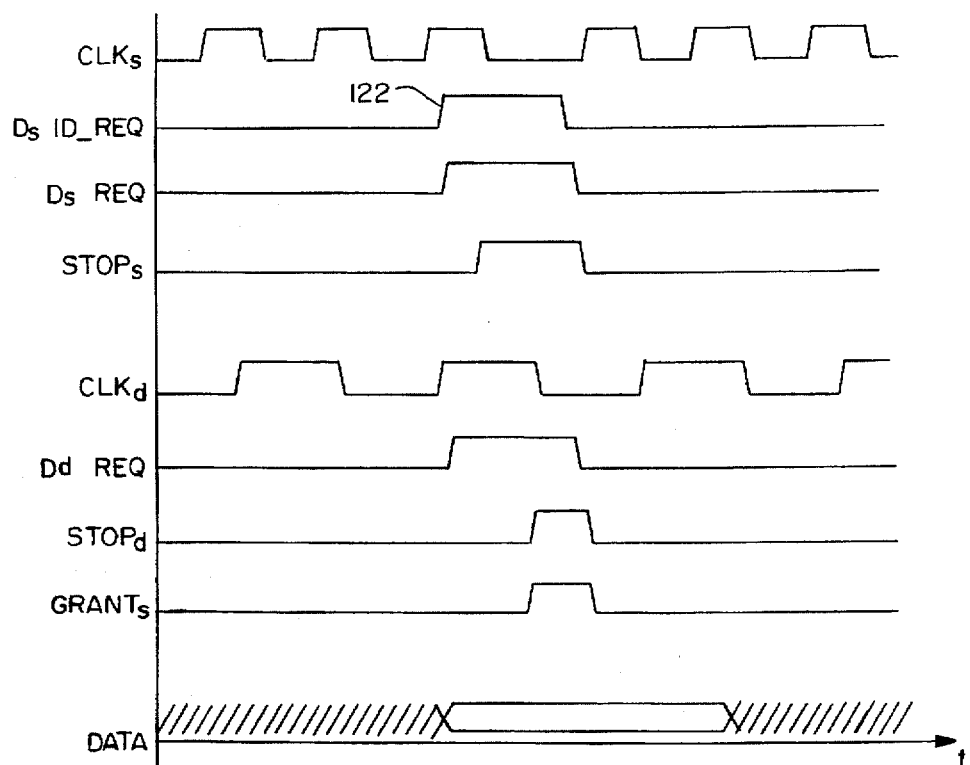
FIG. 11 is a timing diagram for a first-case inter-domain data transfer according to an embodiment of the invention.
Figure 12:
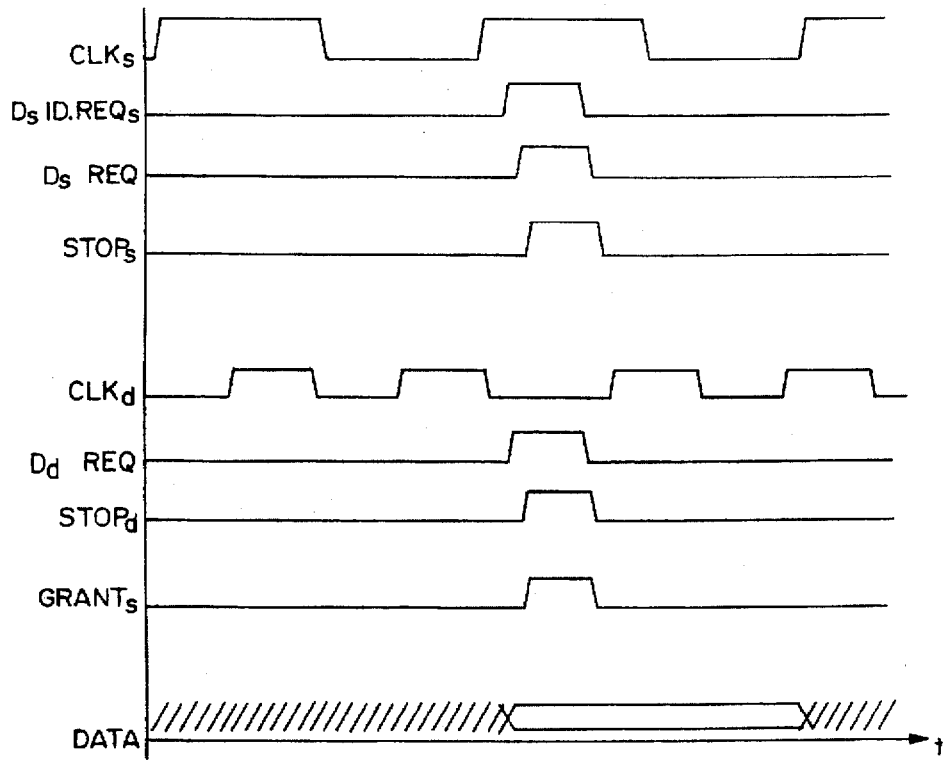
FIG. 12 is a timing diagram for a second-case inter-domain data transfer according to an embodiment of the invention.

Referring to FIGS. 10–12, inter-domain data transfers are described. FIG. 10 shows the source domain 12s and destination domain 12d, along with respective clocks 14s, 14d and arbiters 20s, 20d. Also shown are the data paths 22 embodying signal paths between the domains 12s and 12d. FIG. 11 shows a timing diagram for the data transfer case in which the source domain clock period is shorter than the destination domain clock period. FIG. 12 shows a timing diagram for the data transfer case in which the source domain 12s is longer than the destination domain 12d clock period.

Referring to FIGS. 10 and 11, the data transfer between a faster source domain 12s and a slower destination domain 12d is described. Prior to an inter-domain data transfer the source domain clock signal CLKs and destination domain clock signal CLKd periodically alternate phases as shown in FIG. 11. When the source domain 12s has data to output to domain 12d, a signal Ds ID_REQ (see FIGS. 7 & 10) goes active at domain 12s' data tracker 74. The active edge is labeled 122. Such signal Ds ID_REQ is fed to domain 12s' arbiter 20s and is routed along data paths 22 to domain 12d's arbiter 20d. When signal Ds ID_REQ goes active the data signal for the transfer changes from an indeterminate state to an active state (see FIG. 11—DATA). The data to be transferred stays on the data path for the ensuing clock cycle, then becomes invalid at the start of the second clock cycle.

At the source domain arbiter 20s, arbitration is performed among each signal Di ID_REQ. When Ds ID_REQ wins the arbitration, a request signal Ds REQ goes active. Ds REQ is coupled to the source domain clock 14s. The clock 14s continually arbitrates between the Ds REQ signal and the internal clock signal ICLK (see FIG. 4). When Ds REQ wins the arbitration the clock 14s stops, causing signal STOPs (see FIGS. 4 and 11) to go active and signal CLKs to freeze.

At the destination arbiter 20d, arbitration is performed among each signal Di ID_REQ. When Ds ID_REQ wins the arbitration, a request signal Dd REQ goes active. Dd REQ is coupled to the destination domain clock 14d. The clock 14d continually arbitrates between the Dd REQ signal and the internal clock signal ICLK (see FIG. 4). When Dd REQ wins the arbitration the clock 14d stops, causing signal STOPd (see FIGS. 4 and 11) to go active and signal CLKd to freeze.

The destination clock's 14d stop signal STOPd serves as a grant signal fed back through arbiter 20d for acknowledging the arbitration winner and the completion of a 4-way handshake interlock. The destination domain then reads the data input. Also, a grant signal GRANTs is fed back to the source domain 12s acknowledging the handshake. Activating the GRANTs signal clears the inter-domain data request signal Ds ID_REQ (see FIGS. 7, 11). When Ds ID_REQ goes inactive the source request signal Ds REQ goes inactive. The source arbiter 20s then is free to move on to another arbitration. When DS REQ goes inactive the arbitration at clock 14s no longer chooses Ds REQ as the arbitration winner. Thus, signal STOPs goes inactive (see FIG. 11) and ICLK is able to win the clock arbitration again, restarting the source domain clock.

The data put on the output line by the source domain remains valid during the ensuing clock cycle and becomes invalid at the start of the second clock pulse. Signal DATA goes indeterminate at the start of the second clock pulse.

Once the source domain inter-domain request Ds ID_REQ is cleared, it no longer vies in the destination arbiter's 20d arbitration. Thus, the request signal Dd REQ output from the destination arbiter 20d goes inactive. Thus, Dd REQ no longer vies to win the destination clock's 14d arbitration. Thus, signal STOPd to goes inactive. The destination domain clock CLKd subsequently wins the destination clock arbitration restarting the destination clock 14d. Since the destination domain clock period is longer than the source domain clock period it is possible that hand-shaking completes before the clock signal CLKd would have generated a new pulse. If so, then STOPd goes inactive before the period expires, so that the clock signal CLKd transitions at its normal periodic starting time. FIG. 11 shows the case in which the clock period for clock 14d is not altered during the data transfer. Note, however, that the clock period for clock 14s is stretched to approach that of clock 14d. At the start of CLKd, the data signal DATA is read by domain 12d.

FIG. 12 shows the data transfer timing for a source domain having a longer clock period than the destination domain. As in the previous case Ds ID_REQ goes active causing signal Ds REQ and Dd REQ to go active after respective arbitrations are performed. In turn STOPs and STOPd go active after winning respective arbitrations at the respective clocks 14s, 14d. Also, once DS ID_REQ wins the arbitration at arbiter 20d and Dd REQ wins arbitration at the destination clock 14d, the grant signal GRANTs (i.e., signal STOPd) also goes active. This completes the handshake interlock causing the inter domain data request Ds ID_REQ to be cleared, which in turn causes signals Ds REQ and Dd REQ to go inactive and the clock signal CLKs and CLKd to restart.

Alternative Arbiter/Data Transfer Embodiment

Figure 13:
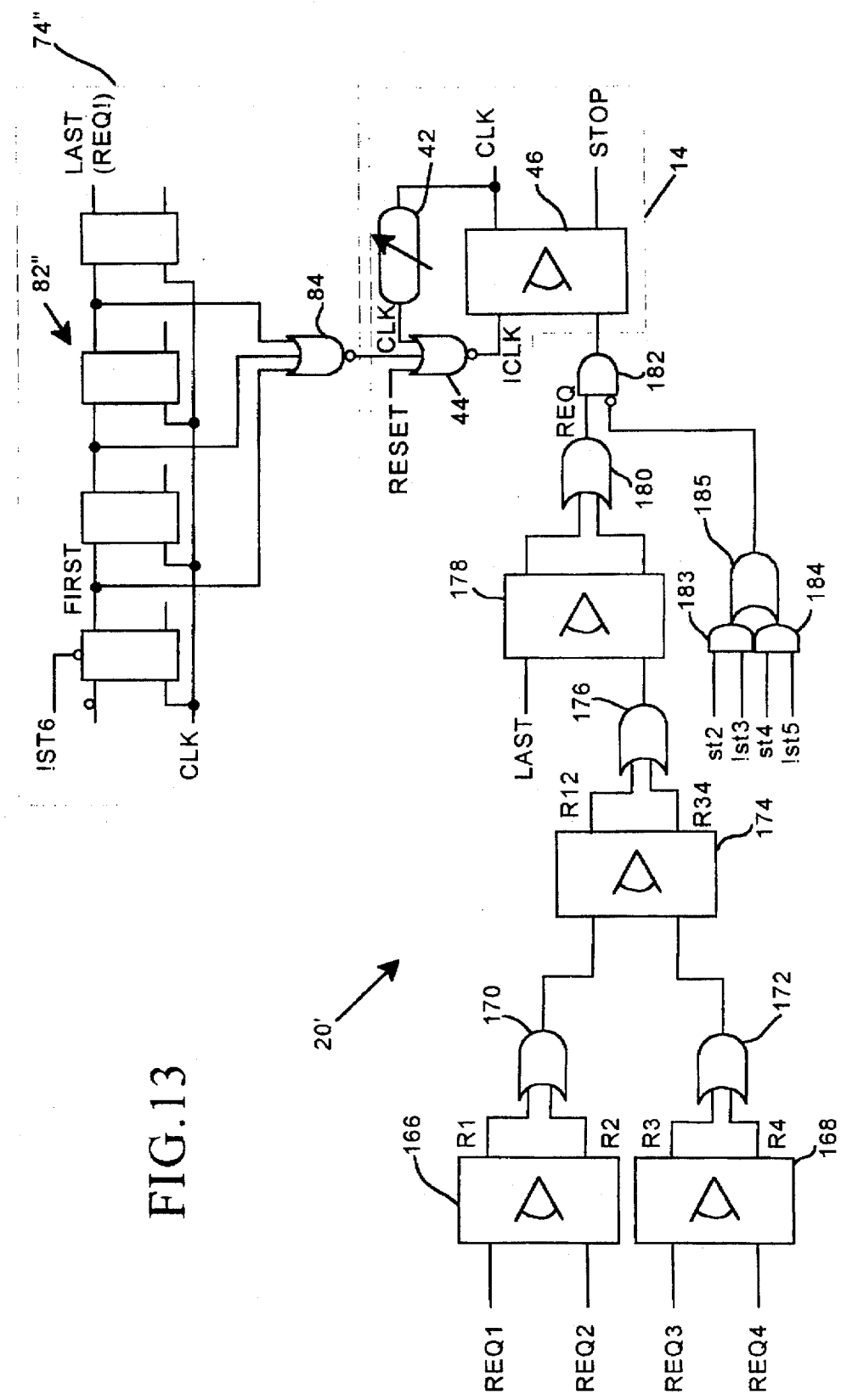
FIG. 13 is a partial schematic diagram of an alternate arbiter embodiment coupled to an asynchronous start/stop clock and data tracking shift register.
Figure 14:
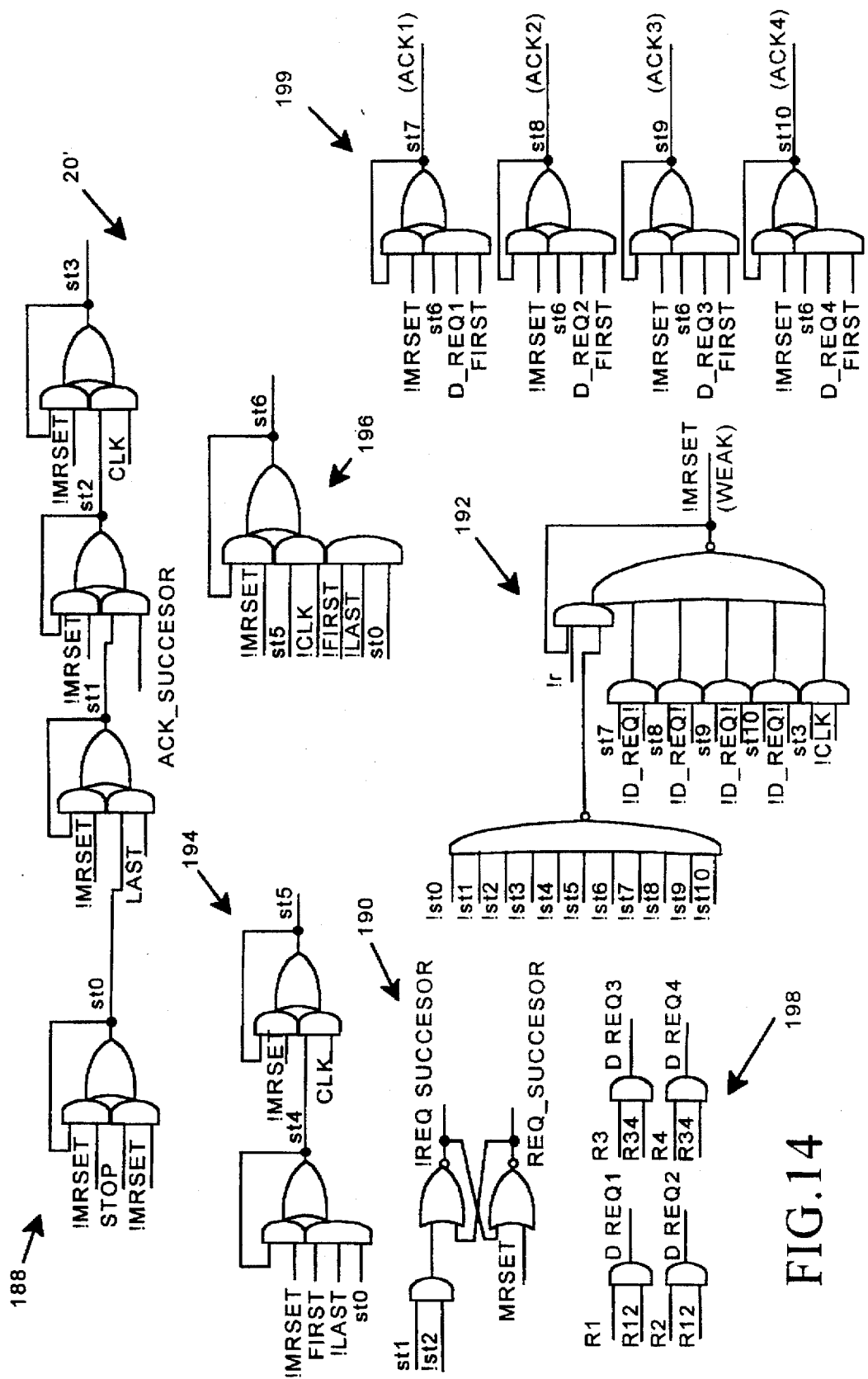
FIG. 14 is additional circuitry for the arbiter embodiment of FIG. 13.
Figure 15:
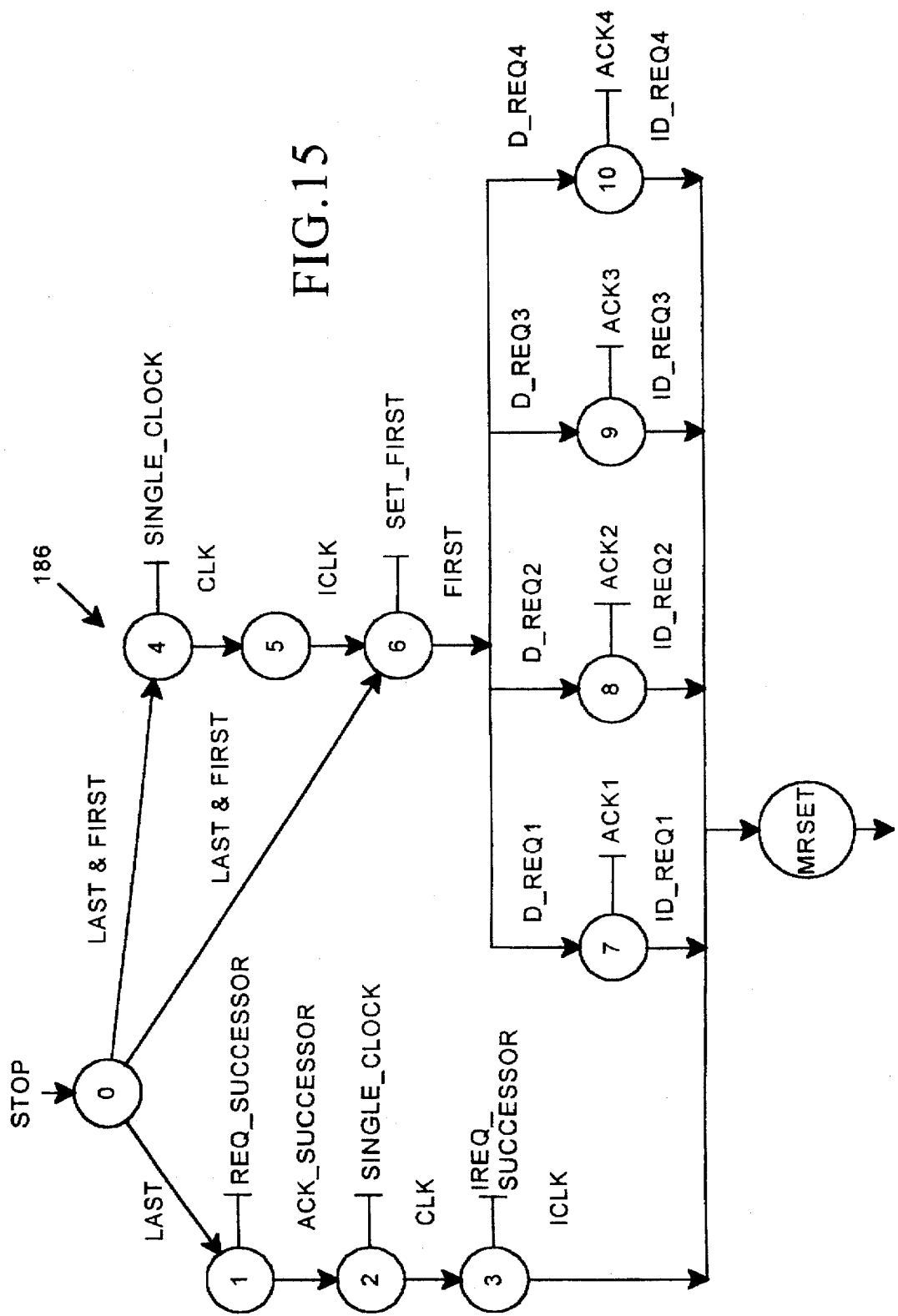
FIG. 15 is a digraph showing the logic flow for an inter-domain data transfer according to the arbiter embodiment of FIGS. 13–14.

FIGS. 13–14 show a preferred embodiment of an arbiter 20'. FIG. 15 shows a digraph of the logic flow for a preferred embodiment of an inter-domain data transfer employing the arbiter 20' of FIGS. 13–14. Referring to FIG. 13, the arbiter 20' is shown coupled to the REQ input of an asynchronous start/stop clock 14. Also shown is a data tracker 74" including a shift register 82" The arbiter 20', clock 14 and data tracker 74" are associated with a common domain 12.

Comparing the data tracker 74" to the data tracker 74 of FIG. 7, similar components are labeled with like numbers.

Also, signal FIRST designates that a tracking bit is set at the first bit of the tracking register 82". Similarly, signal LAST indicates a tracking bit is set at the last bit of the shift register 82". LAST is used to designate an inter-domain data request as per the signal ID_REQ of FIG. 7.

Referring to the arbiter 20' of FIG. 13, a 2-stage arbiter for arbitrating among request from 4 other domains is shown. Each of the other domains generates a signal REQ1, REQ2, REQ3, REQ4, respectively. Such signal is the LAST signal from its own domain. When a source domain requests an inter-domain data transfer, the signal LAST is output to a destination domain arbiter as a signal REQi. In addition, the signal LAST is output to the source domain arbiter as signal LAST.

The arbiter includes a first stage of two mutual exclusion elements 166, 168. Element 166 receives REQ signals from two domains, while element 168 receives REQ signals from two other domains. Signals R1 and R2 are generated from element 166, of which at most one goes active at a given time. Similarly, signals R3 and R4 are generated from element 168. Signals R1 and R2 are OR'ed at gate 170. Signals R3 and R4 are OR'ed at gate 172. The outputs of gates 170, 172 are input to the next arbitration stage which includes a mutual exclusion element 174. Element 174 generates signal R12 and R34 of which at most one goes active at a given time. When REQ1 wins the arbitration, signals R1 and R12 are active. When REQ2 wins the arbitration, signals R2 and R12 are active. When REQ3 wins the arbitration, signals R3 and R34 are active. When REQ4 wins the arbitration, signals R4 and R34 are active. Signals R12 and R34 are OR'ed at gate 176. The output is fed to another mutual exclusion element 178 which arbitrates between external data requests to transfer data into the domain and a local domain request to transfer data out of the domain. Element 178 receives the signal LAST from the local domain's data tracker 74" to indicate a request to transfer data out of the domain. The outputs of element 178 are OR'ed at gate 180 to generate an REQ signal at the local clock 14. To aid in the data transfer, however, the REQ signal is fed into an AND gate 182 first. The output of the AND gate 182 is coupled to the clock 14. The AND gate 182 also receives another signal SINGLE_CLK which is inverted and used for injecting in a single clock pulse during a data transfer. The signal SINGLE_CLK is derived from signals st2 and !st3 or signals st4 and !st5 via logic gates 183, 184, 185. The significance of signal SINGLE_CLK is described below with regard to FIG. 15, a discussion of inter-domain data transfer logic flow.

The signals st2, !st3, st4, !st5 and !st6 shown on FIG. 13 are generated from additional arbiter circuitry shown in FIG. 14. FIG. 14 shows additional arbiter 20' circuitry for deriving signals st0 to st10, REQ_SUCCESSOR, D_REQ1 to D_REQ4, MRSET and ACK1 to ACK4. The circuits receive (1) signals FIRST and LAST from the data tracking shift register 82" of FIG. 13, (2) signals STOP and CLK from the clock 14 of FIG. 13, (3) signals R1, R2, R3, R4, R12 and R34 from the remaining arbiter circuitry of FIG. 13, and (4) signal ACK_SUCCESSOR from another arbiter 20'. ACK_SUCCESSOR is a return signal from a destination domain arbiter acknowledging a completed data transfer. Note that the character "!" is used in the Figures to designate an inverted signal.

Referring to FIG. 15 the logic flow 186 for a data transfer is described. States 0 through 10 are defined for an arbiter receiving REQ signals from up to 4 domains. Whenever a domain's clock activates its STOP signal, state 0 is entered. Stop is activates by the arbiter 20' due to an active LAST, REQ1, REQ2, REQ3 or REQ4 signal. If signal LAST wins the arbitration, then the domain is to be a source domain generating an inter-domain data request to another domain. IF one of the REQi signals won the arbitration, then the domain is to be a destination domain receiving an inter-domain data request from the source domain generating the winning REQ signal.

If the arbiter is to serve a source domain arbiter, then state 1, and subsequently states 2 and 3, are entered. If the arbiter is to serve as a destination domain arbiter, then state 4 or state 6 is entered, followed by states 5, 6 and one of states 7–10 or directly by one of states 7–10.

For a source domain operation, state 1 is entered from state 0. Referring to FIG. 14 circuit 188 shows the logic for activating state signals for states 0, 1, 2 and 3 (st0, st1, st2, and st3). St0 goes active in response to STOP going active. St1 then goes active if signal LAST is active (having caused the STOP signal). Circuit 190 includes a flip-flop which is set when st1 is active. REQ_SUCCESSOR, the flip-flop output, causes the source domain to put data on the signal path for transfer to the destination domain. The source domain then stays in state 1 until an acknowledgement (ACK_SUCCESSOR) of a completed transfer is received from the destination domain. When the acknowledgement is received circuit 188 activates signal st2, causing state 2 to be entered. Referring to FIG. 13, a single clock cycle is started at the source domain once state 2 is entered. Gates 183–185 activate signal SINGLE_CLK during state 2 to cause the clock cycle at source domain clock 14. Once the clock generates its CLK signal pulse, state 3 is entered. Circuit 190 activates signal st3 during state 3. Once st3 is active, the signal SINGLE_CLK goes away so additional clock pulses are not yet generated. Once the clock pulse goes inactive and st3 remains active, circuit 192 generates an arbiter reset signal MRSET. This clears the flip-flop of circuit 190 causing the source domain data to be removed from the data path. MRSET also clears all the state signal st0–st3. Note that once a state signal is set it remains set during the subsequent states until MRSET goes active.

For a destination domain operation, either state 4 or state 6 is entered from state 0. Circuit 190 shows the logic for activation of state 0. State 4 is entered when data is already present at the first bit of the tracking register 82" so as to move the data forward within the domain. State 6 is entered directly when the first bit is open. Circuit 194 of FIG. 14 shows the logic for entering state 4 and activating signal st4. With signal FIRST active during state 0, st4 goes active. Once signal st4 goes active the destination domain arbiter activates signal SINGLE_CLK via logic gates 183–185 (see FIG. 13). SINGLE_CLK causes a single clock pulse to be interjected at the destination domain. Once the CLK signal goes active, circuit 194 activates signal st5, signifying entry to state 5. During the interjected clock cycle, data is moved one link forward in the destination domain to make room for the incoming data. Also, the tracking bit in the FIRST bit location is moved forward. Thus, signal FIRST goes inactive.

Once st5 goes active, signal SINGLE_CLK goes inactive so as not to interject additional clock pulses. Once the CLK signal returns to an inactive level, circuit 196 activates signal st6 causing state 6 to be entered. Alternatively, state 6 is entered directly from state 0 when there is no data at the first link of the domain (i.e., FIRST is inactive). From state 6, one of states 7, 8, 9 or 10 is entered depending on the winner of the arbitration at mutual exclusion elements 166, 168, 174. If a domain 1 request REQ1 won the arbitration, then signal D_REQ1 is activated by circuit 198. If a domain 2 request REQ2 won the arbitration, then signal D_REQ2 is activated by circuit 198. If a domain 3 request REQ3 won the arbitration, then signal D_REQ3 is activated by circuit 198. If a domain 4 request REQ4 won the arbitration, then signal D_REQ4 is activated by circuit 198. If a domain 4 request REQ4 won the arbitration, then signal D_REQ4 is activated by circuit 198.

Once the data from the source domain is received, the tracking register 82" signal FIRST goes active. With FIRST active and one of D_REQi active, then one of signals st7–st10 is activated. Correspondingly, one of states 7–10 is entered. Circuit 199 shows the circuit for activating one of signals st7–st10. Signals st7–st10 correspond to acknowledgement signals (ACK1, ACK2, ACK3, ACK4) for respective source domains. An acknowledgement signal is returned to a corresponding source domain as an ACK_SUCCESSOR signal at the source domain arbiter. In response to the acknowledgement, the source domain deactivates its inter-domain request REQi (during reset). Thus, the corresponding D_REQi at circuit 198 of the destination domain arbiter 20' goes inactive. When the state signal st7, st8, st9, or st10 is active and its corresponding D_REQi transitions inactive, then the data transfer handshake is complete. Circuit 192 then generates a reset signal MRSET at the destination domain arbiter 20'. This clears all the state signals. Note that once a state signal is set it remains set during the subsequent states until MRSET goes active.

Exemplary Domain Embodiments

As previously described, digital circuits can be combined to form domains having a diverse range of complexities. A domain is embodied as an individual register transfer module (RTM), a simple pipeline of RTMS, or a complex arrangement of RTMs. The RTMs are building blocks for defining digital circuit functions. The functions may be simple (as in a simple set of logic gates) or more complex (as in a memory, buffer or adder circuit), or very complex (as in a processor, co-processor, sound board or video accelerator). A single domain system may even be a computer system as a whole. Preferably, a self-tuned computer system is formed by many domains to more finely distribute speed optimization and power efficiency practices.

Figure 16:
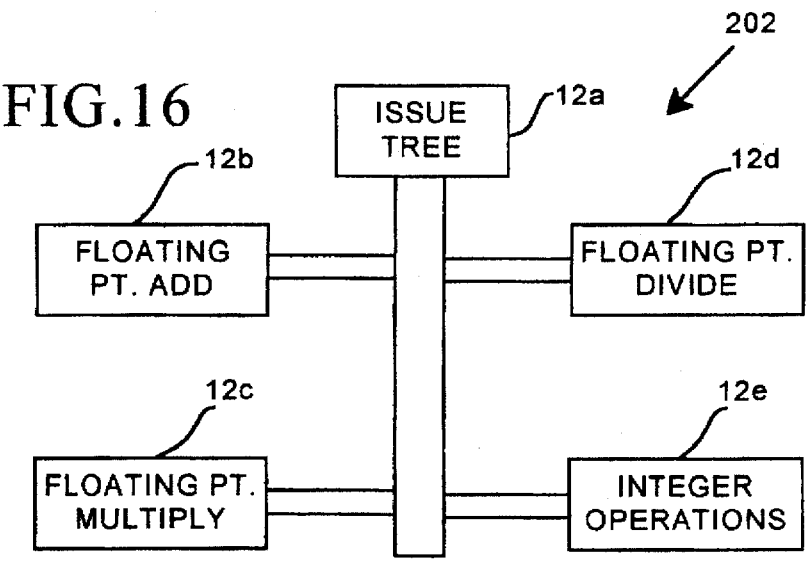
FIG. 16 is a block diagram of a group of domains forming a coprocessor according to an embodiment of this invention.

FIG. 16 depicts a group of domains 12"a–e defining a co-processor 202 for a computer system. The domains are interconnected via dedicated circuit paths 22". Associated with each domain 12"i is a separate clock 14"i, measure apparatus 16"i, tuner 18"i and arbiter 20i (not shown in FIG. 13, but shown in FIG. 1). Domain 12"a serves as the co-processor instruction issue tree. When a co-processor instruction is to be processed, information is routed to the co-processor issue tree 12"a. The tree 12"a then determines which one or more other domains is to be requested to process the instruction. In a co-processor having redundant circuits (e.g., multiple adders, multipliers), the instruction is routed to more than one or the first available domain of the kind to process the instruction. Thus, a floating point add is routed to one or more floating point add domains 12"b.

Figure 17:
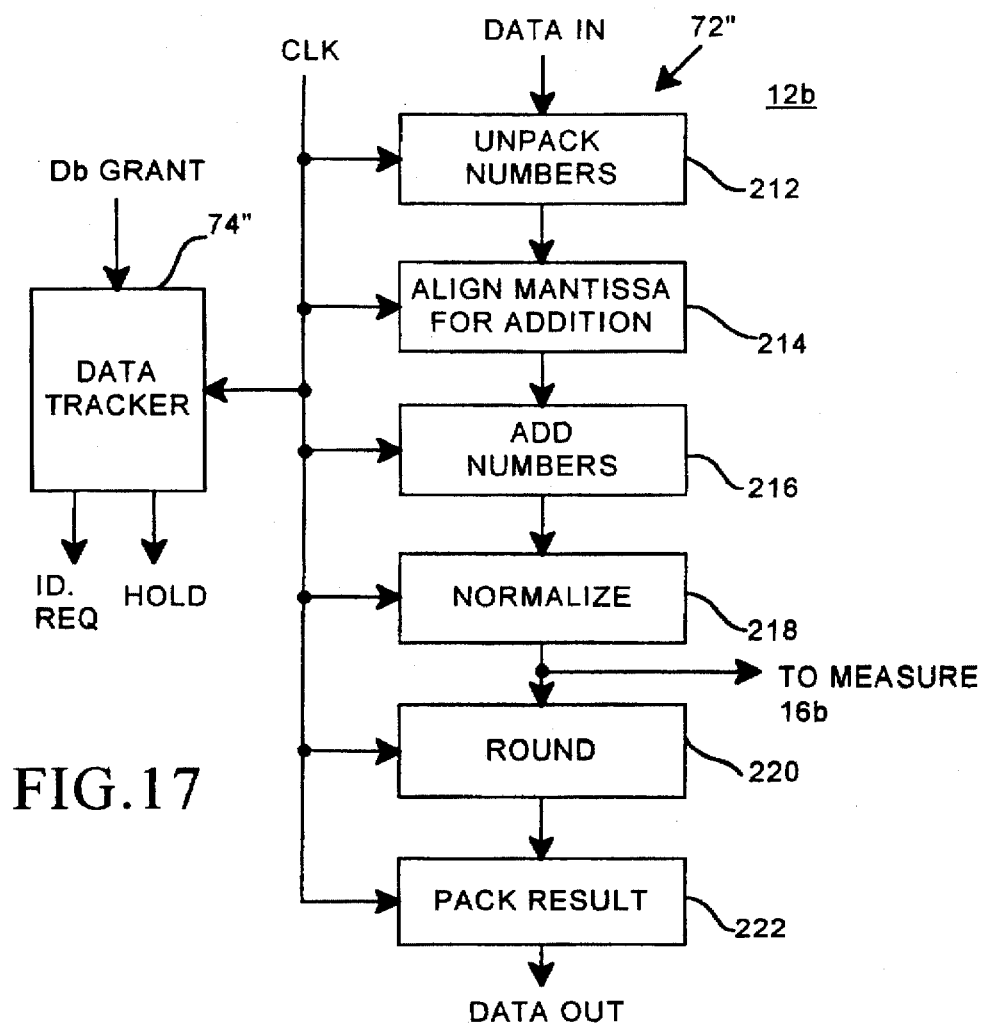
FIG. 17 is a block diagram of an adder domain of the coprocessor of FIG. 16.

FIG. 17 depicts an adder domain 12"b for the coprocessor 202. The domain 12"b is formed by digital logic 72" and a data tracker 74", according to the basic domain structure of FIG. 6. The digital logic 72" is formed by register transfer modules designed to perform the adder functions. The adder RTMs form circuits for performing the adder steps: unpack numbers 212, align mantissa for addition 214, add numbers 216, normalize 218, round 220 and pack results 222. A data value DATA IN enters the logic 72" and ripples through during multiple clock cycles until a result DATA OUT is output. A clock signal CLK from the domain's clock advances the data through the logic 72".

A measurement is taken off a link of the data path in logic 72" selected at design time. Such measurement is used to tune the adder domain 12"b to run at optimal speed.

A data tracker 74" determines when data is present for the adder 12"b to process. When no data is present signal L_REQ is active. When a data input is finished being processed signal ID_REQ becomes active to request to transfer DATA OUT to a particular domain, (e.g., issue tree 12"a, a memory domain, a cache domain, a bus-like domain or another domain according to the design).

Problems and Means for Solving Problems

The primary problem addressed by the invention is the inherently inefficient manner of designing digital circuits to a worst-case timing analysis. The self-tuning clocking methodology defines a new clocking paradigm enabling circuits to run at near maximum speed. In particular, a clocking domain is tuned by monitoring circuit speed and increasing clock speed until near maximum speed for the domain. Over time if the circuit response times vary due to temperature changes or voltage perturbations, the clock is tuned to maintain near maximum domain speed. In addition, the clock inherently self-tunes itself by responding to the environmental changes in a similar manner as the domain circuits. Thus, a voltage change slowing the domain circuits also slows the clock circuit. This is achieved by an asynchronous stop/start clock embodied on the same wafer as its domain.

Another problem addressed by the invention is the increasing difficultly in distributing the clock in high speed, highly complex circuits and systems (i.e., 60 MHz and faster RISC and Pentium™ systems). The multiple domain architecture of this invention includes a separate clock for each domain. Such clocks are independent resulting in asynchronous domains. Thus, the clock signal does not have to be distributed outside the domain and throughout the system. Further, in many embodiments the clock and its domain are formed on the same wafer. Accordingly, the clock signal has less distance to travel than in comparably-complex synchronous systems. Clock distribution therefore becomes a more manageable design process.

In a system of multiple domains each domain has its own clock, which is independently tuned. The domains form a system of globally asynchronous clock domains. Another problem addressed by the invention is the resulting glitches that typically accompany mis-matched clock cycles. Glitches in synchronous circuits corrupt data exchanges. Similarly, glitches could corrupt data exchanges among asynchronous domains. This problem is solved by an interdomain data transfer method. Four-way handshaking is performed between two domains to exchange data. In effect, the clock period of one domain is stretched to the clock period of a slower domain during the data transfer cycle.

Another problem addressed by the invention is power consumption. It is desirable to implement an efficient power consumption scheme in digital circuits. To improve power consumption efficiency, a domain's clock is run only when the domain has data to process. Consider, for example, a personal computer based upon the self-tuning paradigm formed by several domains, including one or more domains for a floating point co-processor. Text editing is a common application of a computer. Text editing typically does not involve floating point calculations. Thus, in an embodiment of this invention, the floating point co-processor domains would not be clocked during text editing. This would save considerable amounts of power. In a personal computer using the conventional synchronous clocking paradigm, the floating point processor would be clocked even if it had no data to process. Thus, power is wasted in the conventional system, and saved in a system embodying this invention.

Another problem addressed by this invention is how to decide which domain is to be allowed to transfer data into a given domain during a given clock period. A domain is constrained to receive only one data input during a given clock period. If multiple other domains request to transfer data into a single domain, the single domain needs to decide which domain will be granted access for that clock period. According to the invention, an arbitration scheme is implemented so that only one request is granted during a given clock period.

Meritorious and Advantageous Effects

One advantageous effect of the invention is that performance speed is optimized for each clock domain, and thus, for a system as a whole. Another advantageous effect is that a domain executes only when it has data to process. When there is no data to process, the domain's clock is stopped. When the clock is stopped, minimal power is consumed (due only to leakage currents). Thus, a domain and a system of domains have improved power consumption efficiency. Another advantage of the invention is that glitch-free data transfers occur among asynchronous domains. Another advantage is that a diversity of digital circuit complexities can embody a domain. A domain may be a few gates, a specific logic array (e.g., adder; integer or floating point multiplier; integer or floating point divider), a sub-system (i.e., floating point unit, co-processor, sound card, video accelerator), or a system (e.g., computer). A system domain typically embodies a one domain system (e.g., personal computer system).

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method of clocking a domain of register transfer modules, the domain for performing run-time logic operations on input data to generate output data, comprising the steps of:

generating a clock signal for the domain from an adjustable-period-length clock;

repetitively sampling a prescribed register transfer module output signal during a clock period;

detecting a logic-level transition among output signal samples;

determining from when among the samples the output signal transition occurred that the clock period is one of too long, too short, or in tune; and either one of adjusting or not adjusting the clock period length automatically in response to the determining step.

2. The method of claim 1 in which the sampling, detecting, determining and adjusting / not adjusting steps are performed at domain start-up to tune the clock period.

3. The method of claim 1 in which the sampling, detecting, determining and adjusting / not adjusting steps are performed intermittently during run-time logic operations performed by the domain and serve to tune the clock period.

4. The method of claim 1 in which the sampling, detecting, determining and adjusting / not adjusting steps are performed continuously during run-time logic operations performed by the domain and serve to tune the clock period.

5. The method of claim 1, in which the step of adjusting comprises the following steps:

increasing the clock period when determined to be too short; and decreasing the clock period when determined to be too long.

6. The method of claim 5, in which the step of increasing comprises increasing the clock period when determined to be too short for a prescribed number of consecutive clock periods.

7. The method of claim 5, in which the step of decreasing comprises decreasing the clock period when determined to be too long for a prescribed number of consecutive clock periods.

8. The method of claim 1 in which the adjustable-period clock and the domain of register transfer modules are formed on a common semiconductor chip, the clock automatically adjusting the clock period length in response to variations in register transfer module switching speed caused by voltage perturbations and temperature changes.

9. The method of claim 1, further comprising the step of: discontinuing the step of generating a clock signal while the domain has no data to process.

10. The method of claim 1, further comprising the steps of:

tracking when data is present in the domain;

stopping the clock when the domain has no data to process; and starting the clock, after the stopping step, when data enters the domain.

11. The method of claim 1 for independently clocking multiple domains of register transfer modules;

wherein said domains form a system of asynchronous clock domains; and wherein the steps of generating, sampling, detecting, determining and adjusting/not adjusting are performed independently for each domain; and wherein there is an adjustable-period clock for each domain, each adjustable-period clock comprising an asynchronous start/stop clock.

12. A method of independently clocking multiple domains of register transfer modules, the clocking of a given domain of the multiple domains comprising the steps of:

generating a clock signal for the domain from an adjustable-period clock;

repetitively sampling a prescribed register transfer module output signal during a clock period;

detecting a logic-level transition among output signal samples;

determining from when among the samples the output signal transition occurred that the clock period is one of too long, too short, or in tune; and either one of adjusting or not adjusting the clock period in response to the determining step; and wherein said multiple domains form a system of asynchronous clock domains; and wherein the steps of generating, sampling, detecting, determining and adjusting / not adjusting are performed independently for each of the multiple domains; and wherein there is an adjustable-period clock for each domain, each adjustable-period clock comprising an asynchronous start/stop clock; and Wherein the multiple domains comprise a source domain and a destination domain; and further comprising the step of transferring data between the source domain and the destination domain, the transferring step comprising the steps of:

generating at the source domain a request to transfer data to the destination domain;

outputting data from the source domain;

arbitrating at the destination domain among transfer requests from multiple domains;

generating a return grant signal to the source domain after the destination domain arbitration selects the source domain request;

inputting the data at the destination domain; and terminating the source domain request in response to the return grant signal.

13. The method of claim 12, further comprising the step of stretching the clock cycle of either one or both of the destination domain and source domain during the transferring step.

14. The method of claim 13, in which the destination clock cycle stretching comprises the steps of:

pausing the destination domain clock signal after the destination domain arbitration selects the source domain request; and releasing the destination domain clock signal after the source domain request terminates.

15. The method of claim 13, in which the source domain clock cycle stretching comprises the steps of:

pausing the source domain clock signal after the source domain generates the request; and releasing the source domain clock signal after the source domain request terminates.

16. A self-tuning apparatus, comprising:

a first domain of register transfer modules which performs run-time logic operations on input data to generate output data;

a first adjustable-period-length clock for generating a clock signal for the first domain;

means for sampling a prescribed first domain's register transfer module output signal during a clock period;

means for detecting a logic-level transition among the output signal samples;

means for determining from when among the samples the output signal transition occurred that the clock period is one of too long, too short, or in tune; and means for adjusting the clock period of the first clock automatically in response to the determining step to self-tune the clock period for the domain.

17. The apparatus of claim 16, wherein the adjusting means increases the clock period when determined to be too short and decreases the clock period when determined to be too long.

18. The apparatus of claim 16, wherein the adjusting means increases the clock period when determined to be too short for a prescribed number of consecutive clock periods.

19. The apparatus of claim 16, wherein the adjusting means decreases the clock period when determined to be too long for a prescribed number of consecutive clock periods.

20. The apparatus of claim 16, wherein the first adjustable-period clock, the first domain of register transfer modules, the sampling means, the detecting means, the determining means and the adjusting means are formed on a common semiconductor chip, the adjusting means automatically adjusting the clock period length in response to variations in register transfer module switching speed caused by voltage perturbations and temperature changes.

21. The apparatus of claim 16, further comprising:

means for determining when the first domain has no data to process, and wherein the clock signal is discontinued while the domain has no data to process.

22. The apparatus of claim 21 in which the means for determining when the first domain has no data to process comprises:

means for tracking when data is present in the first domain;

means for requesting the first clock to be stopped when the first domain has no data to process; and means for discontinuing the request to stop when data enters the first domain.

23. The apparatus of claim 22, in which the tracking means comprises a shift register which receives a tracking bit when data enters the first domain and shifts the tracking bit through the register as data advances through the first domain.

24. The apparatus of claim 16, wherein the sampling means comprises means for defining a sampling interval.

25. The apparatus of claim 16, further comprising a second domain of register transfer modules;

a second adjustable-period clock for generating a clock signal for the first domain;

means for sampling a prescribed second domain's register transfer module output signal during a clock period;

means for detecting a logic-level transition among the second domain output signal samples;

means for determining from when among the samples the second domain output signal transition occurred, that the second clock's clock period is one of too long, too short, or in tune; and means for adjusting the clock period of the second clock in response to the determining step.

26. The apparatus of claim 25, in which the first and second domain are part of a system of independently-clocked asynchronous clock domains.

27. The apparatus of claim 26, in which the first clock comprises a first asynchronous start/stop clock, and the second clock comprises a second asynchronous start/stop clock.

28. The apparatus of claim 16, in which the sampling means, detecting means, determining means and adjusting means self-tune the clock period during run-time logic operations performed by the domain.

29. A self-tuning apparatus, comprising a first domain of register transfer modules;

a first adjustable-period clock for generating a clock signal for the first domain;

means for sampling a prescribed first domain's register transfer module output signal during a clock period;

means for detecting a logic-level transition among the output signal samples;

means for determining from when among the samples the output signal transition occurred that the clock period is one of too long, too short, or in tune;

means for adjusting the clock period of the first clock in response to the determining step;

a second domain of register transfer modules;

a second adjustable-period clock for generating a clock signal for the first domain;

means for sampling a prescribed second domain's register transfer module output signal during a clock period;

means for detecting a logic-level transition among the second domain output signal samples;

means for determining from when among the samples the second domain output signal transition occurred, that the second clock's clock period is one of too long, too short, or in tune;

means for adjusting the clock period of the second clock in response to the determining step;

means generating at the first domain a request to transfer data to the second domain;

means for outputting data from the first domain;

means for arbitrating at the second domain among transfer requests from multiple domains;

means for generating a return grant signal to the first domain when the destination domain arbitration selects the first domain request;

means for inputting the data at the second domain; and means for terminating the first domain request in response to the return grant signal; and wherein the first and second domain are part of a system of independently-clocked asynchronous clock domains wherein the first clock comprises a first asynchronous start/stop clock, and the second clock comprises a second asynchronous start/stop clock.

30. The apparatus of claim 29, further comprising: means for stretching the clock cycle of the second clock during a data transfer from the first domain to the second domain.

31. The apparatus of claim 30, in which the stretching means comprises:

means for pausing the second domain clock signal after the second domain arbitration selects the first domain request; and means for releasing the second domain clock signal after the first domain request terminates.

32. The apparatus of claim 29, further comprising means for stretching the clock cycle of the first clock during a data transfer from the first domain to the second domain.

33. The apparatus of claim 32, in which the stretching means comprises:

means for pausing the first domain clock signal after the first domain generates the request; and means for releasing the first domain clock signal after the first domain request terminates.

34. The apparatus of claim 29, in which the first clock comprises an inverter, an adjustable delay element and a mutual exclusion element forming a self-inverting loop, the first clock signal being output from the mutual exclusion element and fed back through the adjustable delay element and inverter as an input to the mutual exclusion element, the mutual exclusion element also receiving a stop request input, the mutual exclusion element performing a signal arbitration between the stop request input and the fed back clock signal to activate the clock signal when the fed back clock signal wins the arbitration and to stop the clock signal when the stop request input wins the arbitration.

35. The apparatus of claim 34, further comprising means for stretching the clock cycle of the first clock during a data transfer from the first domain to the second domain, the stretching means comprising:

means for generating the stop request input after the first domain generates the data transfer request; and means for cancelling the stop request after the first domain request terminates.

36. A method of tuning a domain of register transfer modules, comprising the steps of:

generating a clock signal for the domain from an adjustable-period-length clock;

inputting a tuning vector data sample to the domain;

detecting an output response to the tuning vector;

comparing the output response to a desired response;

tuning the clock period of the clock automatically based upon results of the comparing step; and wherein the steps of inputting, detecting, comparing and tuning are repeatedly performed either one of intermittently or continuously during run-time logic operations performed by the domain.

37. The method of claim 36, in which the tuning step comprises increasing the clock period when the comparing step indicates that the clock period is too short.

38. The method of claim 36, in which the detecting step comprises repetitively sampling a prescribed register transfer module output signal during a clock period.

39. The method of claim 38, in which the comparing step comprises the steps of:

detecting a logic-level transition among output signal samples; and determining from when among the samples the output signal transition occurred that the clock period is one of too long, too short, or in tune.

40. The method of claim 39, in which the step of tuning comprises:

increasing the clock period when determined to be too short; and decreasing the clock period when determined to be too long.

41. A method of independently clocking multiple domains of register transfer modules, the clocking of a given domain of the multiple domains comprising the steps of:

generating a clock signal for the given domain from an adjustable-period clock;

repetitively sampling a prescribed register transfer module output signal of the given domain during a clock period;

detecting a logic-level transition among the output signal samples;

determining from when among the samples the output signal transition occurred that the clock period is one of too long, too short, or in tune; and either one of adjusting or not adjusting the clock period in response to the determining step to self-tune the clock period for the given domain; and wherein said multiple domains form a system of independent asynchronous clock domains; and wherein there is an independent adjustable-period clock for each domain, each adjustable-period clock comprising an asynchronous start/stop clock;

wherein the sampling, detecting, determining and adjusting / not adjusting steps for a given domain are performed either one of intermittently or continuously during run-time logic operations performed by the given domain; and wherein corresponding steps of generating, sampling, detecting, determining and adjusting / not adjusting are performed independently for each one of the multiple domains to independently self-tune each one of the multiple domains.

42. A self-tuning apparatus, comprising a first domain of register transfer modules;

a first adjustable-period clock for generating a clock signal for the first domain;

means for sampling a prescribed first domain's register transfer module output signal during a clock period;

means for detecting a logic-level transition among the output signal samples;

means for determining from when among the samples the output signal transition occurred that the clock period is one of too long, too short, or in tune; and means for adjusting the clock period of the first clock in response to the determining step.

wherein the first adjustable-period clock, the first domain of register transfer modules, the sampling means, the detecting means, the determining means and the adjusting means are formed on a common semiconductor chip, the adjusting means automatically adjusting the clock period in response to run-time variations in register transfer module switching speed caused by voltage perturbations and temperature changes.

43. A method for transferring data among independently-clocked domains forming a system of asynchronous clock domains, each domain comprising a plurality of register transfer modules, a first asynchronous start/stop clock generating a first clock signal for a source domain and a second asynchronous start/stop clock generating a second clock signal for a destination domain, wherein the first clock signal has either one of a shorter or longer clock cycle than the second clock signal while both the first clock signal and second clock signal are transitioning without interruption, the method comprising the steps of:

generating at the source domain a request to transfer data to the destination domain;

outputting first data from the source domain onto a bus linking the source domain and destination domain;

stopping the first clock signal after the source domain request is generated;

arbitrating at the destination domain among transfer requests from multiple domains, wherein the transfer requests include the request from the source domain;

after the destination domain arbitration selects the source domain request, stopping the second clock signal;

after the destination domain arbitration selects the source domain request, generating a return grant signal to the source domain;

terminating the source domain request in response to the return grant signal;

starting the first clock signal after the source domain request is terminated, wherein the first data output by the source domain stays valid on the bus during the ensuing clock cycle of the first clock signal occurring upon starting the first clock signal;

starting the second clock signal after the source domain request is terminated;

upon starting the second clock signal, inputting the data at the destination domain; and wherein the steps of stopping the second clock signal and starting the second clock signal result in the second clock signal skipping either one of none or one clock cycle of a second clock signal transitioning without interruption, and wherein the steps of stopping the second clock signal and starting the second clock signal result in the second clock signal skipping not more than one clock cycle of the second clock signal transitioning without interruption.

* * * * *